United States Patent
Fujimoto et al.

(10) Patent No.: US 8,270,716 B2
(45) Date of Patent: Sep. 18, 2012

(54) SELECTIVELY COMPRESSING PICTURE AND TEXT AREAS OF AN IMAGE TO MAINTAIN HIGHEST QUALITY AND EFFECTIVE COMPACTION

(75) Inventors: Hideomi Fujimoto, Kanagawa (JP); Yoshikazu Gyobu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 957 days.

(21) Appl. No.: 12/314,109

(22) Filed: Dec. 4, 2008

(65) Prior Publication Data

US 2009/0141048 A1   Jun. 4, 2009

(30) Foreign Application Priority Data

Dec. 4, 2007 (JP) ................................ 2007-314041
Nov. 11, 2008 (JP) ................................ 2008-288766

(51) Int. Cl.
*G06K 9/34* (2006.01)
(52) U.S. Cl. ...................................................... 382/176
(58) Field of Classification Search .................. 345/673; 382/176

See application file for complete search history.

(56) References Cited

U.S. PATENT DOCUMENTS

| 2008/0013785 A1 | 1/2008 | Gyobu |
| 2008/0037073 A1 | 2/2008 | Fujimoto |

FOREIGN PATENT DOCUMENTS

| JP | 11-075069 | 3/1999 |
| JP | 2001-223903 | 8/2001 |
| JP | 2001/230937 | 8/2001 |
| JP | 2002-010084 | 1/2002 |
| JP | 2002/298083 | 10/2002 |
| JP | 2003/058878 | 2/2003 |
| JP | 2005-348435 | 2/2005 |
| JP | 4062474 | 1/2008 |

OTHER PUBLICATIONS

English language Abstract of JP 2001-230937 dated Aug. 24, 2001.
Office Action dated Oct. 7, 2009 issued in corresponding Japanese Application No. 2008288766.

*Primary Examiner* — Edward Martello
(74) *Attorney, Agent, or Firm* — Harness, Dickey & Pierce, P.L.C.

(57) ABSTRACT

Image processing is done by separating image data into foreground image data, background image data, and mask image data. The foreground image data is divided into a plurality of square blocks composed of a plurality of pixels. The difference between maximum pixel values and minimum pixel values in each square block is compared to a threshold value. If the difference is below the threshold, the pixel value data in the square block is averaged. If the difference is above the threshold, the plurality of square blocks may be subdivided into smaller square blocks and the difference calculated again. If the difference is below the threshold, the pixel value data in the smaller square block is averaged. If the difference is above the threshold, the smaller square block is not averaged. Each of the foreground image data, background image data and mask image data are then individually compressed and merged.

10 Claims, 18 Drawing Sheets

(BINARY)
MASK IMAGE DATA (MULTIVALUED)
FOREGROUND IMAGE DATA

BEFORE RESOLUTION IS CONVERTED
(a)

AFTER RESOLUTION IS CONVERTED
(b)

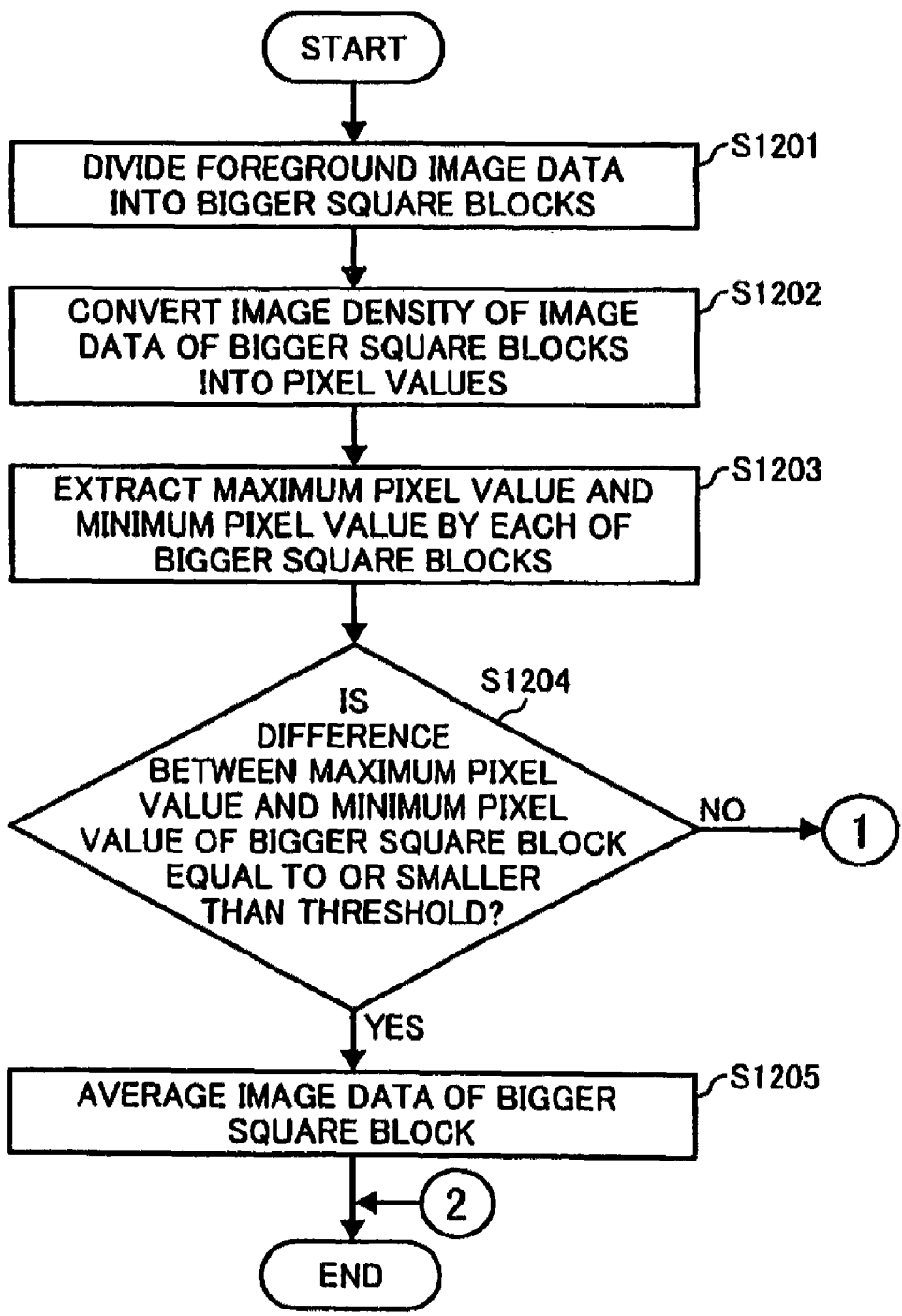

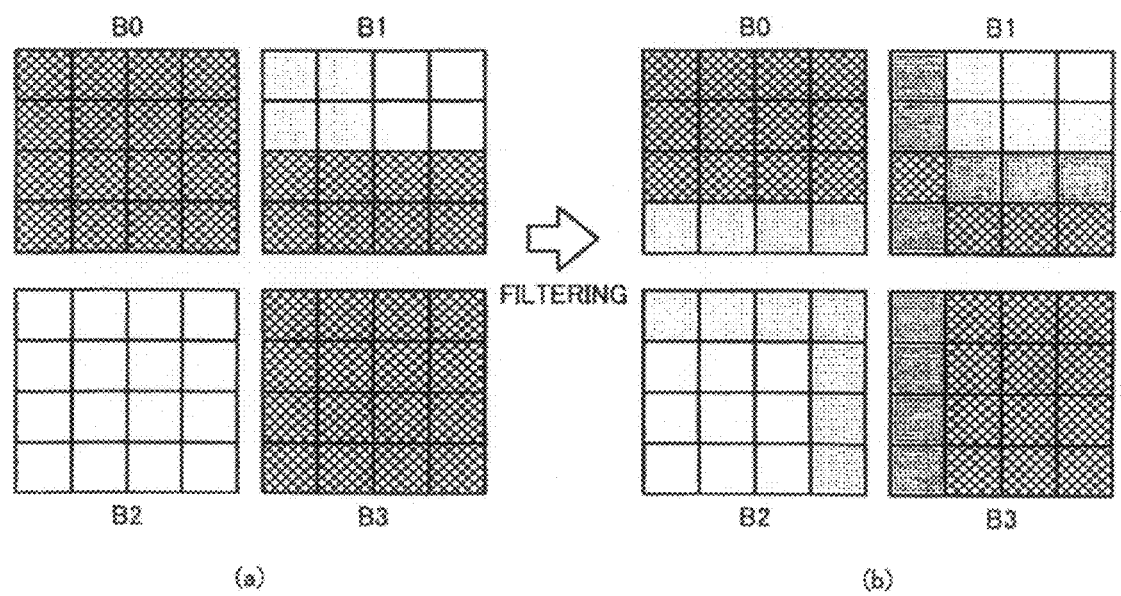

SELECTIVELY COMPRESSING PICTURE AND TEXT AREAS OF AN IMAGE TO MAINTAIN HIGHEST QUALITY AND EFFECTIVE COMPACTION

CROSS-REFERENCE TO RELATED APPLICATIONS

The present application claims priority to and incorporates by reference the entire contents of Japanese priority document 2007-314041 filed in Japan on Dec. 4, 2007 and Japanese priority document 2008-288766 filed in Japan on Nov. 11, 2008.

BACKGROUND OF THE INVENTION

1. Field of the Invention

The present invention relates to a technology for encoding image data.

2. Description of the Related Art

Various methods have been developed for compressing or encoding image data. Amount of image data can be reduced by compressing or encoding. Consequently, it is possible to send the original image data in a shorter time via a network, i.e., to achieve high-speed data communication, and store the original image data in a smaller storage space.

Furthermore, there is know a technology for dividing image data into a picture area and a text area, for example, as disclosed in Japanese Patent Application Laid-open No. 2003-58878. The resolution of image data of each of the picture area and the text area is converted into an appropriate resolution, and the resolution-converted image data is compressed. After that, the resolution-converted image data of the picture area and the text area are merged into one image data. By such an operation, the original image data can be compressed with high efficiency.

In this manner, compressing or encoding is effective in reducing the amount of data. Therefore, for example, when a document including a picture (such as a photo or a pattern) or a line image (such as a text or a symbol) is compressed or encoded beforehand, it is possible to store/transmit/receive the document at high speed and/or with high efficiency.

However, if image data is processed by using the technique of dividing the image data into a picture area and a text area, and if the image data of each of the picture area and the text area is compressed or encoded uniformly, it may cause degradation of the image quality.

SUMMARY OF THE INVENTION

It is an object of the present invention to at least partially solve the problems in the conventional technology.

According to an aspect of the present invention, there is provided an image processing apparatus including a separating unit that separates image data into foreground image data, background image data, and mask image data, the foreground image data including color information of a first area of the image data where a text or a line image is included, the background image data including an image of a second area of the image data where a picture is included, and the mask image data including shape information of the text or the line image; a resolution converting unit that converts the foreground image data into low-resolution foreground image data; a dividing unit that divides the low-resolution foreground image data into a plurality of square blocks composed of a plurality of pixels; an averaging unit that calculates an average pixel value of the pixels included in each of the square blocks, and changes pixel values of the pixels in the square blocks to the average pixel value of that square block thereby obtaining averaged foreground image data of the square blocks; a compressing unit that performs a compression process on the averaged foreground image data of the square blocks thereby obtaining compressed foreground image data of the square blocks; and a merging unit that merges the compressed foreground image data of all the square blocks with the background image data, and the mask image data thereby obtaining compressed image data.

According to another aspect of the present invention, there is provided an image processing method including separating image data into foreground image data, background image data, and mask image data, the foreground image data including color information of a first area of the image data where a text or a line image is included, the background image data including an image of a second area of the image data where a picture is included, and the mask image data including shape information of the text or the line image; converting the foreground image data into low-resolution foreground image data; dividing the low-resolution foreground image data into a plurality of square blocks composed of a plurality of pixels; first calculating an average pixel value of the pixels included in each of the square blocks, and changing pixel values of the pixels in the square blocks to the average pixel value of that square block thereby obtaining averaged foreground image data of the square blocks; performing a compression process on the averaged foreground image data of the square blocks thereby obtaining compressed foreground image data of the square blocks; and first merging the compressed foreground image data of all the square blocks with the background image data, and the mask image data thereby obtaining compressed image data.

According to still another aspect of the present invention, there is provided a computer program product including a computer-readable recording medium having a computer program stored thereon which when executed on a computer causes the computer to execute the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 depicts an example of a 3×3 filter used by a 3×3 filtering unit shown in FIG. 13;

FIG. 15 is an explanatory diagram of a filtering process performed on image data of an 8×8 square block by the filtering unit shown in FIG. 13;

DETAILED DESCRIPTION OF THE PREFERRED EMBODIMENTS

Exemplary embodiments of the present invention are explained in detail below with reference to the accompanying drawings.

Figure 1:
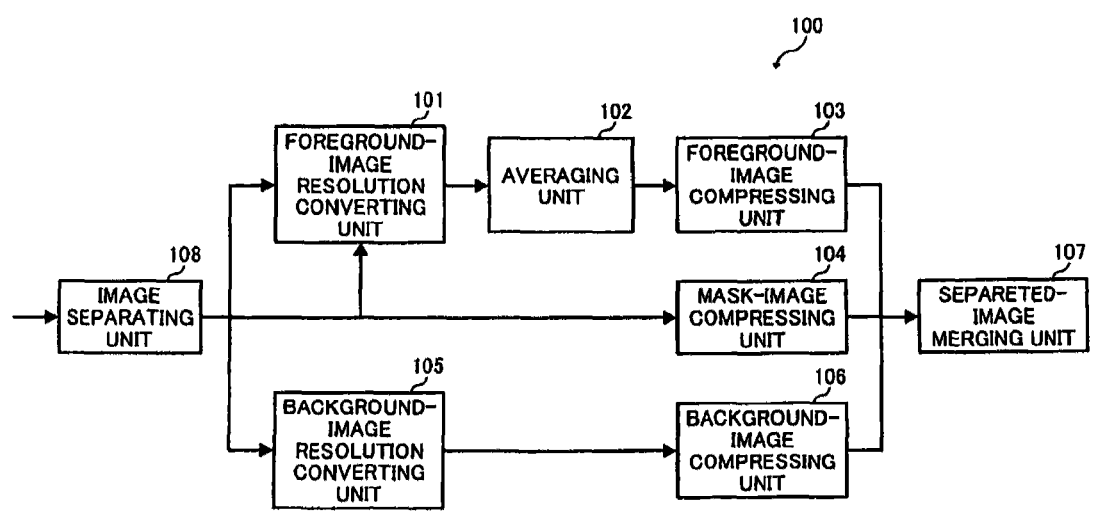
FIG. 1 is a block diagram of an image processing apparatus according to a first embodiment of the present invention.

FIG. 1 is a block diagram of an image processing apparatus 100 according to a first embodiment of the present invention. The image processing apparatus 100 includes an image separating unit 108, a foreground-image resolution converting unit 101, an averaging unit 102, a foreground-image compressing unit 103, a mask-image compressing unit 104, a background-image resolution converting unit 105, a background-image compressing unit 106, and a merging unit 107.

The image separating unit 108 receives image data via a network (not shown) or from a scanner unit (not shown) as input image data. The input image data is, for example, image data on a document.

The image separating unit 108 separates the input image data into background image data, foreground image data, and mask image data.

The background image data is multivalued image data on an image of an area of the input image data where an image of a photo or a picture is included. The foreground image data is multivalued image data on, for example, color information of an area of the input image data where a text or a line image is included. The mask image data is binary image data on separation information of the separation between a background image and a foreground image and shape (edge) information of the text or the line image.

To separate a picture and a text, for example, a technique of extracting a text or a line image from input image data based on the image density, the brightness, and edges of the text or the line image can be employed.

The common feature of the above techniques is that the entire portion of the input image data other than the extracted text or line image is regarded as a picture (such as a photo, or a pattern), and image data of that portion is stored as a multivalued background image. Color information of a color text or a color line image is stored as a multivalued foreground image. Shape information of the text or the line image (i.e., edge information) is converted into binary image data, and the binary image data is stored as mask image data.

Figure 2:
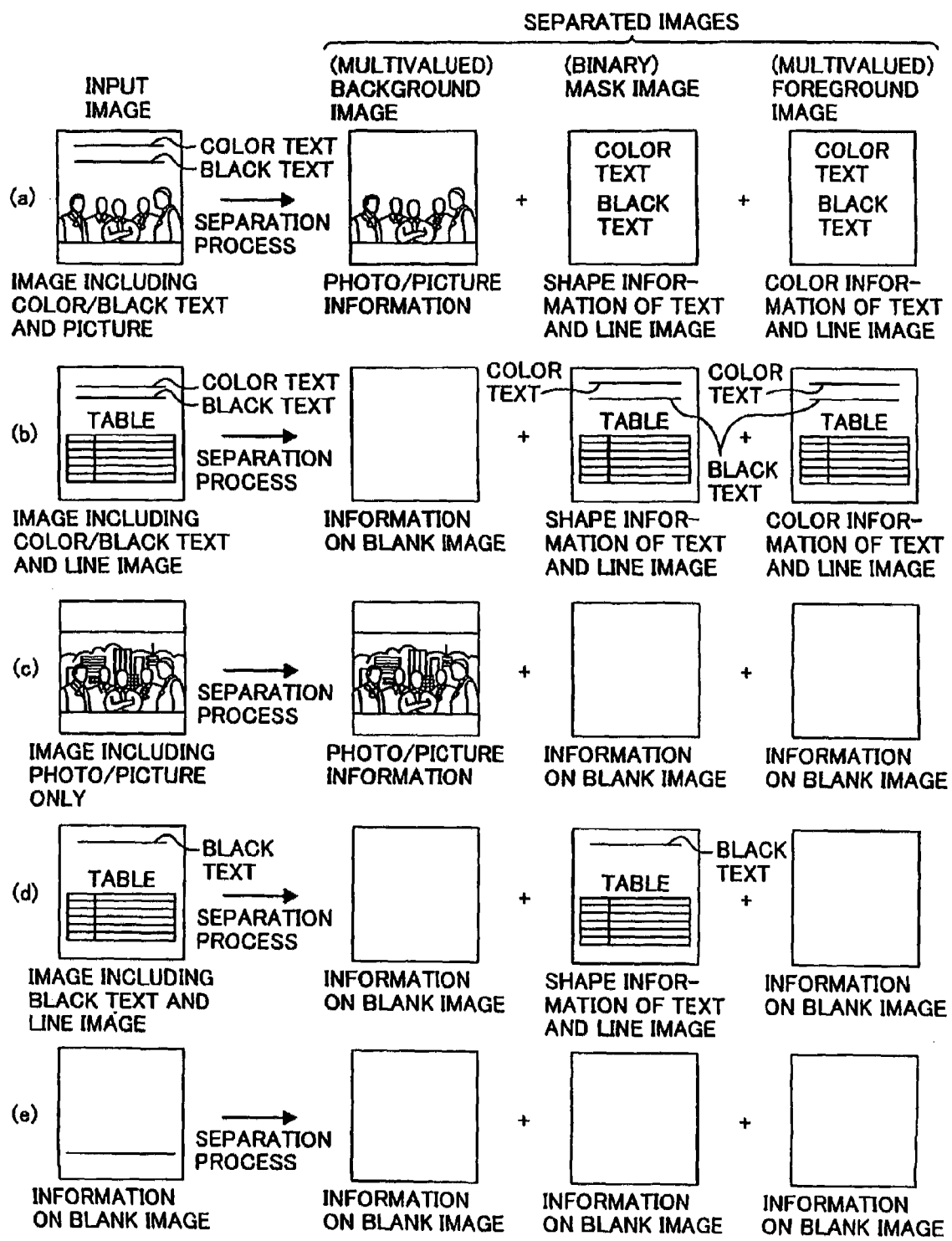
FIG. 2 shows examples of input image data for explaining how the input image data is separated into foreground image data, background image data, and mask image data.

FIG. 2 depicts examples of input image data (a) to (e) for explaining how each of the input image data (a) to (e) is separated into foreground image data, background image data, and mask image data by the image separating unit 108. Incidentally, the image separating unit 108 can separate the image data by using any known separation method.

One example of such separation methods is explained below. Edge information of input image data is acquired, and pixels of an edge portion of the input image data are converted into "1", and pixels of the other portion, i.e., a non-edge portion are converted into "0", whereby the input image data is converted into binary image data. In this binary image data, the effective values of the binary edge image typically concentrate in a portion corresponding to a text, a line image, and the like. Such binary image data is treated as mask image data. Foreground image data is obtained by a logical AND operation of the mask image data and the original input image data. As a result, multivalued image data on a text area of the input image data is obtained. The obtained multivalued image data is treated as the foreground image data. On the contrary to the foreground image data, background image data is obtained by extracting a portion of the original input image data corresponding to the non-edge portion of the mask image data. Multivalued image data on the extracted portion is treated as the background image data. In this manner, the image separating unit 108 separates the input image data into the mask image data, the foreground image data, and the background image data.

The image separating unit 108 separates each of the input image data (a) to (e) into corresponding foreground image data, mask image data, and background image data as shown in FIG. 2.

When input image data is composed of a line image and a picture as the input image data (a) shown in FIG. 2, the image separating unit 108 separates the input image data into foreground image data including color information of the line image, mask image data including shape information of the line image, and background image data including information on the picture.

When input image data is composed of only a line image as the input image data (b) shown in FIG. 2, the image separating unit 108 separates the image data into foreground image data including color information of the line image, mask image data including shape information of the line image, and background image data including information on a blank image (i.e., including nothing).

When input image data is composed of only a picture as the input image data (c) shown in FIG. 2, the image separating unit 108 separates the image data into foreground image data including information on a blank image, mask image data including information on a blank image, and background image data including information on the picture.

When input image data is composed of only a black line image as the input image data (d) shown in FIG. 2, the image separating unit 108 separates the image data into foreground image data including information on a blank image, mask image data including shape information of the line image, and background image data including information on a blank image.

When input image data is composed of only a blank image as the input image data (e) shown in FIG. 2, the image separating unit 108 separates the image data into foreground image data including information on a blank image, mask image data including information on a blank image, and background image data including information on a blank image.

Incidentally, the separation between line image data and picture image data can be performed, for example, by recognizing the line image data based on a series of dots. It is possible to employ any known separation method to separate image data.

To return to the explanation of FIG. 1, the foreground-image resolution converting unit 101 converts the foreground image data into low-resolution image data. The low-resolution conversion performed on the foreground image data by the foreground-image resolution converting unit 101 will be explained in detail later. In the low-resolution conversion, the resolution of the foreground image data is reduced, for example, to 150 dots per inch (dpi). In the present embodiment, the edge information is preserved in the mask image data and the color information is preserved in the foreground image data. The color information in the foreground image data is not affected even if the resolution of the foreground image data is low. In other words, importance is given to the compression ratio of the foreground image data. Therefore, the foreground-image resolution converting unit 101 converts the foreground image data into low-resolution image data. As a result, an amount of information included in the foreground image data can be reduced.

Figure 3:
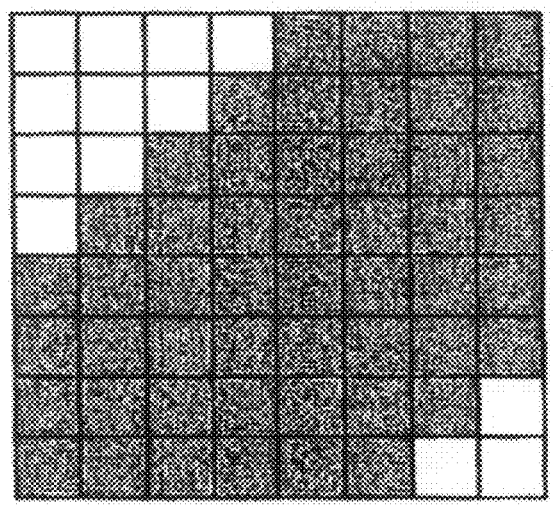
FIG. 3 depicts an example of mask image data.

How the foreground-image resolution converting unit 101 converts the foreground image data into low-resolution image data is explained in detail below. In the present embodiment, it is assumed that pixels are reduced by half in both main and sub scanning directions by the low-resolution conversion. FIG. 3 depicts an example of binary mask image data that is used in the low-resolution conversion of multivalued foreground image data subject shown in FIG. 4. An image area of the foreground image data shown in FIG. 4 corresponding to an area in black (a mask area) of the mask image data shown in FIG. 3 is subject for the low-resolution conversion.

Figure 4:
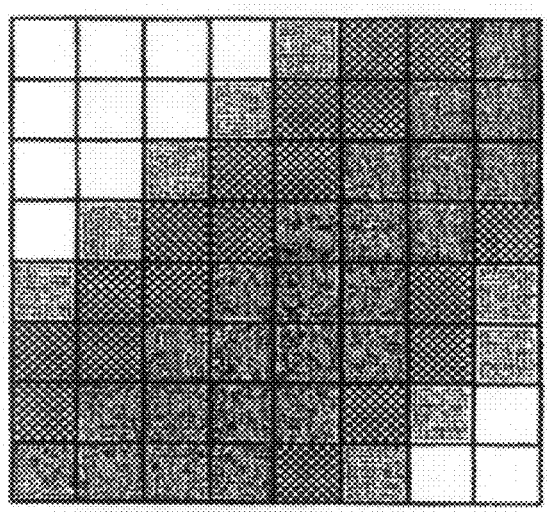
FIG. 4 depicts an example of foreground image data.
Figure 5:
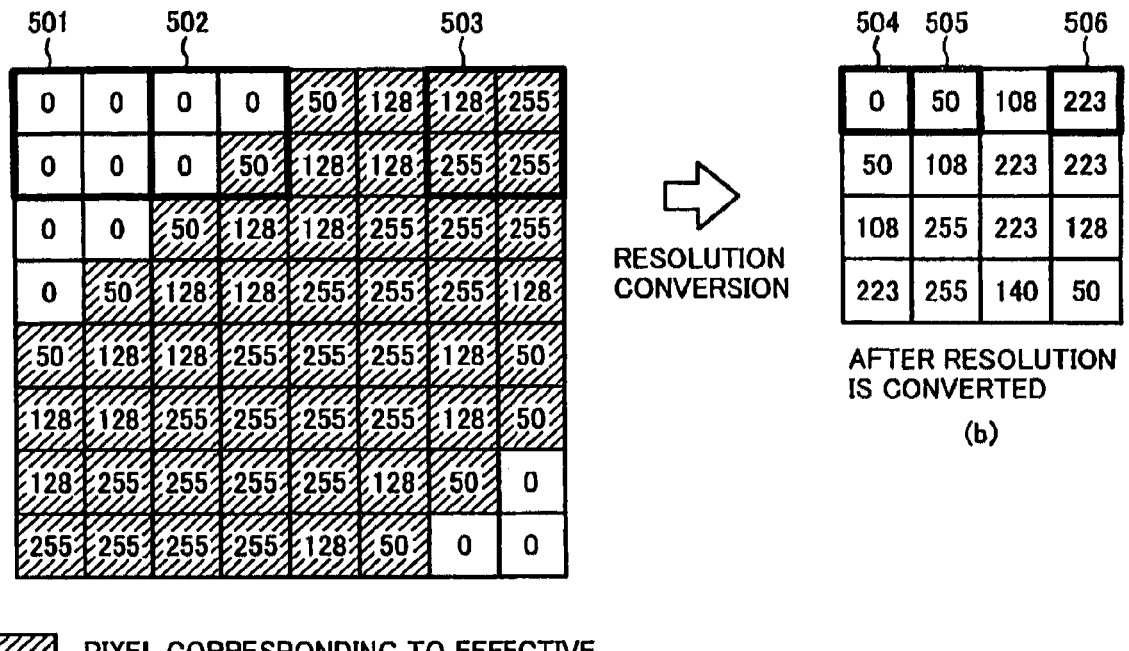
FIG. 5 is a schematic diagram for explaining how the foreground image data shown in FIG. 4 is converted into low-resolution image data.

FIG. 5 is an explanatory diagram for explaining conversion of the foreground image data shown in FIG. 4 into low-resolution image data. Image data (a) shown in FIG. 5 represents the foreground image data shown in FIG. 4 converted into pixel values. Image data (b) shown in FIG. 5 is the resultant of the low-resolution conversion of the foreground image data. Incidentally, in the image data shown in FIG. 5, the pixel values are set under such conditions that a white pixel is "0" and a black pixel is "255". A shaded area of the image data (a) indicates pixels corresponding to effective pixels of the mask image data shown in FIG. 3. In the present embodiment, the calculation of the low-resolution conversion is performed based on only pixel values of the pixels corresponding to the effective pixels of the mask image data. For example, the foreground-image resolution converting unit 101 determines that there is no effective pixel in a square block 501 composed of 2×2 pixels because all the pixels in the square block 501 are not shaded, i.e., are not included in the area in black of the mask image data. Therefore, the foreground-image resolution converting unit 101 outputs "0" as pixel values of the pixels in the square block 501. As a result of the reduction, a pixel value of a pixel 504 (i.e., a square block composed of a 1×1 pixel) of the image data (b) becomes "0". Furthermore, there is one effective pixel in a square block 502 composed of 2×2 pixels, i.e., one of the pixels in the square block 502 is included in the area in black of the mask image data. A pixel value of this pixel is "50". The foreground-image resolution converting unit 101 calculates a pixel value of a pixel 505 of the image data (b) by not the calculation of "(50+0+0+0)/4" but "50/1=50". The foreground-image resolution converting unit 101 outputs "50" as the pixel value of the pixel 505 that the square block 502 is reduced thereto.

Moreover, there are four effective pixels in a square block 503 composed of 2×2 pixels, i.e., all the pixels in the square block 503 are included in the area in black of the mask image data. The foreground-image resolution converting unit 101 calculates "(128+255+255+255)/4", and outputs "233 (decimals are omitted)" as a result of the calculation, i.e., a pixel value of a pixel 506 of the image data (b) shown in FIG. 5 is "223". The foreground-image resolution converting unit 101 performs such processing on whole the foreground image data. In this manner, the foreground image data including the color information of the text is converted into low-resolution image data without adding the pixel value "0" of the non-text area. Therefore, when the processed image data is displayed, for example, in a Portable Document Format (PDF), the image data can be prevented from such decrease in image quality that the print is so light.

The averaging unit 102 performs an averaging process on the foreground image data by each of the square blocks so as to increase the compression ratio of the result obtained in the foreground-image compressing unit 103.

Figure 6:
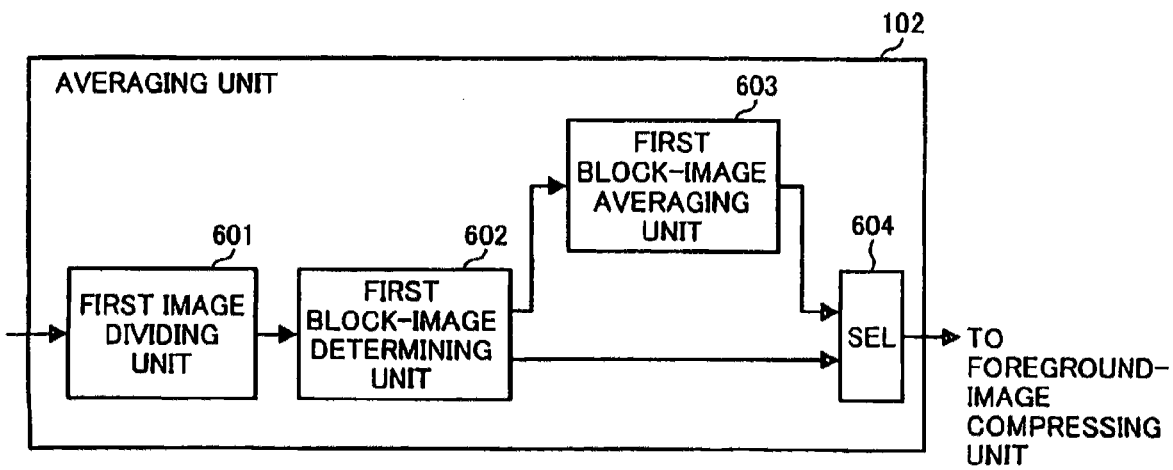
FIG. 6 is a block diagram of an averaging unit shown in FIG. 1.

FIG. 6 is a detailed functional block diagram of the averaging unit 102. The averaging unit 102 includes a first image dividing unit 601, a first block-image determining unit 602, a first block-image averaging unit 603, and a selector (denoted by "SEL" in FIG. 6) 604.

The first image dividing unit 601 divides an image area of the foreground image data into square blocks subject for the averaging process. A size of the square blocks is determined depending on a compression format used by the foreground-image compressing unit 103. For example, when the foreground-image compressing unit 103 compresses the foreground image data in a Joint Photographic Experts Group (JPEG) format, the first image dividing unit 601 divides the image area of the foreground image data into square blocks composed of 8×8 pixels (hereinafter, "8×8 square blocks") because the JPEG compression usually employs an 8×8 square block as the minimum coded unit.

The first block-image determining unit 602 calculates a difference between the maximum pixel value and the minimum pixel value by each of the 8×8 square blocks, and determines whether the difference exceeds a predetermined threshold. Therefore, it is possible to perceive a density variation of image data of each of the 8×8 square blocks. When the first block-image determining unit 602 determines that the difference exceeds the threshold, the first block-image averaging unit 603 does not perform the averaging process on the corresponding 8×8 square block. On the other hand, when the first block-image determining unit 602 determines that the difference is equal to or smaller than the threshold, the first block-image averaging unit 603 performs the averaging process on the corresponding 8×8 square block. Incidentally, the threshold is set arbitrarily in accordance with actual processing, and a specific value of the threshold will not be mentioned.

The first block-image averaging unit 603 calculates an average pixel value by each of the 8×8 square blocks. In the present embodiment, only when the first block-image determining unit 602 determines that a difference between the maximum pixel value and the minimum pixel value of an 8×8 square block is equal to or smaller than the threshold, the first block-image averaging unit 603 performs the averaging process on image data of the 8×8 square block.

In this manner, after image data is divided into square blocks of m×m pixels, an average pixel value of any of the square blocks to be averaged is calculated by the first block-image averaging unit 603. Then, pixel values of the corresponding square block are changed to the calculated average pixel value, whereby image data of the square block can be flattened. As a result, a significant change in image density of the image data can be reduced, and thus it is possible to achieve a higher encoding ratio and a higher compression ratio than the normal image-data compression (for example, the JPEG compression).

The selector 604 selects any of image data of the 8×8 square block averaged by the first block-image averaging unit 603 and image data of the 8×8 square block received from the first block-image determining unit 602, i.e., not-averaged by the first block-image averaging unit 603, and outputs the selected image data of the 8×8 square block.

Specifically, when the first block-image determining unit 602 determines that a difference between the maximum pixel value and the minimum pixel value of the 8×8 square block exceeds the threshold, i.e., determines that a density variation of image data of the 8×8 square block is large, the selector 604 selects the image data of the 8×8 square block received from the first block-image determining unit 602 as the one to be output. On the other hand, when the first block-image determining unit 602 determines that a density variation of image data of the 8×8 square block is small, the selector 604 selects averaged image data of the 8×8 square block received from the first block-image averaging unit 603 as the one to be output. This is because, in the present embodiment, when the density variation is large, it is determined that a change in image quality from that of the original image data is increased by performing the averaging process on the image data; and conversely, when the density variation is small, it is determined that an image quality of the image data is not affected by performing the averaging process thereon.

Figure 7:
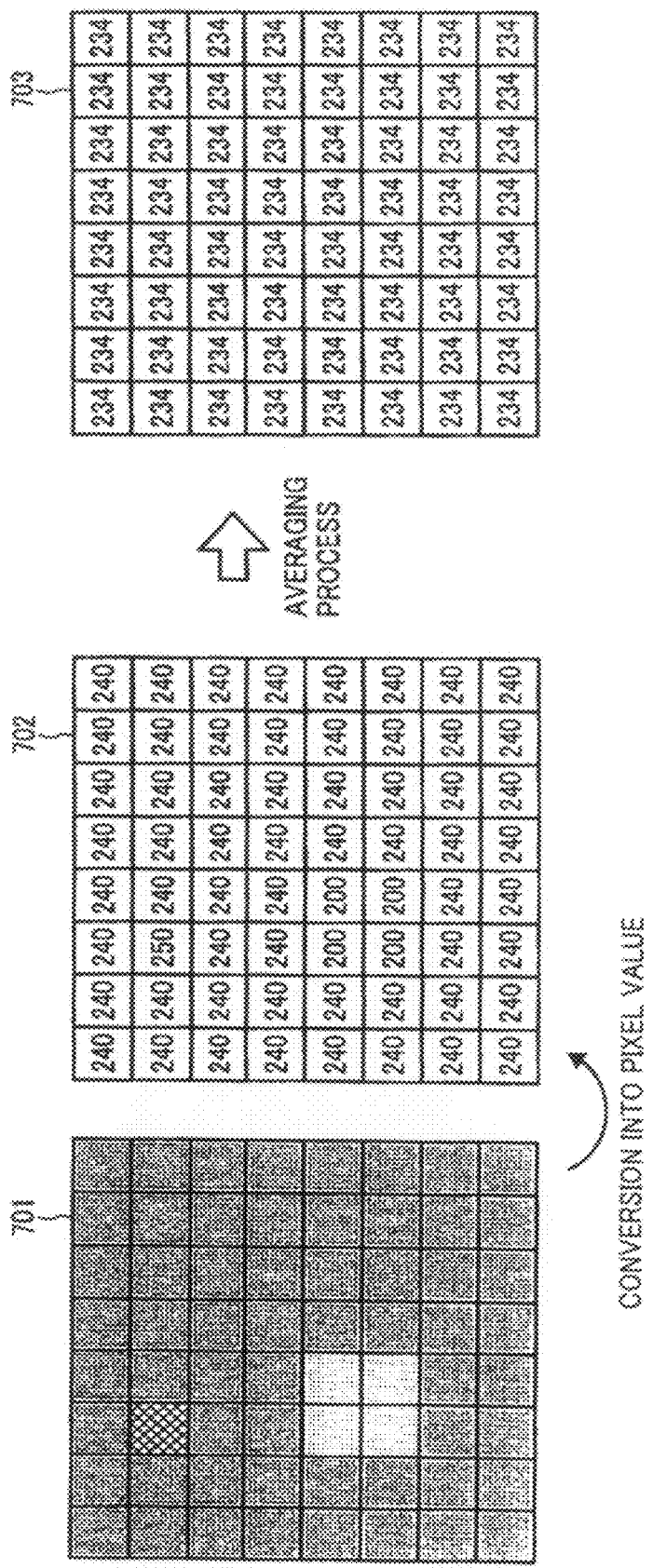
FIG. 7 is an explanatory diagram of an averaging process performed on foreground image data by the averaging unit shown in FIG. 6.

FIG. 7 is an explanatory diagram for explaining the averaging process performed on foreground image data by the averaging unit 102. First, the first block-image determining unit 602 determines whether to perform the averaging process on an 8×8 square block 701 based on the pixel density of which. Specifically, the first block-image determining unit 602 converts each of pixels composing the 8×8 square block 701 into pixel values in a range of 0 to 255 (see an 8×8 square block 702). Then, the first block-image determining unit 602 determines whether to perform the averaging process on the 8×8 square block 702. Incidentally, closer the pixel value to 0 is, closer the color of the pixel to white is; and conversely, closer the pixel value to 255 is, closer the color of the pixel to black is.

When determining that the 8×8 square block 702 is to be averaged, the first block-image determining unit 602 outputs image data of the 8×8 square block 702 to the first block-image-averaging unit 603.

Upon receiving the image data of the 8×8 square block 702, the first block-image averaging unit 603 calculates an average pixel value of the 8×8 square block 702, and changes all pixel values of the 8×8 square block 702 to the calculated average pixel value (see an 8×8 square block 703) (the averaging process). In other words, the averaging process is performed on the image data of the 8×8 square block 702, resulting in the image data of the 8×8 square block 703.

When the image data of the 8×8 square block 703 is selected by the selector 604, the selector 604 outputs the image data of the 8×8 square block 703 to the foreground-image compressing unit 103.

To return to the explanation of FIG. 1, the foreground-image compressing unit 103 performs an encoding process on the foreground image data processed by the averaging unit 102. In the present embodiment, the foreground-image compressing unit 103 encodes the foreground image data by performing a compression process on the multivalued foreground image data (for example, by the JPEG compression or the JPEG 2000 compression). The foreground image data subject for the encoding process is composed of image data of the square blocks selected by the selector 604, i.e., including pixels that pixel values of some square blocks of the pixels are changed to the average pixel value calculated by the first block-image averaging unit 603.

The mask-image compressing unit 104 performs lossless encoding (for example, modified Huffman (MH) coding, modified READ (MR) coding, modified modified READ (MMR) coding, or Joint Bi-level Image Experts Group (JBIG) coding) on the binary mask image data received from the image separating unit 108.

In the present embodiment, the mask-image compressing unit 104 performs lossless encoding on the binary mask image data by the MH coding method or the JBIG coding method. These lossless coding methods are suitable for compression of binary image data, although not suitable for compression of multivalued image data because of their low compression ratio.

The background-image resolution converting unit 105 converts the background image data received from the image separating unit 108 into low-resolution image data. It doesn't matter the background image data, including information on a picture or a photo requiring a smooth image quality, is set at low resolution, so that the background image data is converted into low-resolution image data to reduce an amount of information of which.

The background-image compressing unit 106 performs an encoding process on the low-resolution background image data received from the background-image resolution converting unit 105. In the present embodiment, the background-image compressing unit 106 encodes the background image data by performing a compression process on the multivalued background image data (for example, by the JPEG compression or the JPEG 2000 compression).

In the present embodiment, as described above, foreground image data and background image data are respectively converted into low-resolution image data. However, mask image data including shape information of a line image or a text requiring a sharp image quality needs to be maintained at a high resolution. Therefore, in the present embodiment, the mask image data is not converted into low-resolution image data.

For example, when the resolution of input image data is 300 dpi, mask image data of the input image data is maintained at the resolution of 300 dpi so as to keep the visibility and the smoothness of edges of the line image or the text. On the other hand, foreground image data of the input image data is converted into low-resolution image data at the resolution of 150 dpi. As long as the smoothness of the edges is preserved in the mask image data, a slight change in color is acceptable, so that the foreground image data is converted into low-resolution image data to increase the compression ratio. Furthermore, background image data of the input image data is converted into low-resolution image data at the resolution of 200 dpi. The reason why the resolution of the background image data is set to be higher than that of the foreground image data is to make the compression ratio of the background image data lower than that of the foreground image data because the background image data includes details of the background image.

The multivalued background image data and the multivalued foreground image data are compressed by the discrete cosine transform (DCT) based JPEG compression. This is because in the JPEG compression, image data is irreversibly transformed, so that the JPEG compression is suitable for compression of multivalued image data such as image data on a natural image, although not suitable for compression of binary image data requiring a sharply-defined edge.

The merging unit 107 merges the foreground image data, the background image data, and the mask image data, which are compressed respectively, into one file in any format, for example, in a PDF file. By reading the file in which image data that multiple image data is merged thereinto is stored, it is possible to display the image data including all of photo/picture information included in the background image data, shape information of the text or the line image included in the mask image data, and color information of the text or the line image included in the foreground image data.

The technology for merging multiple image data in a PDF file is disclosed by Adobe Systems Inc. By storing merged image data in a PDF file by employing this technology, it is possible to store multiple image data in a superimposed manner. Specifically, encoding methods used in each of the multiple image data are written in the file, so that even when the multiple image data is compressed by a different encoding method from one another, such as the JPEG compression and the MH coding method, the multiple image data can be stored in the superimposed manner.

Figure 8:
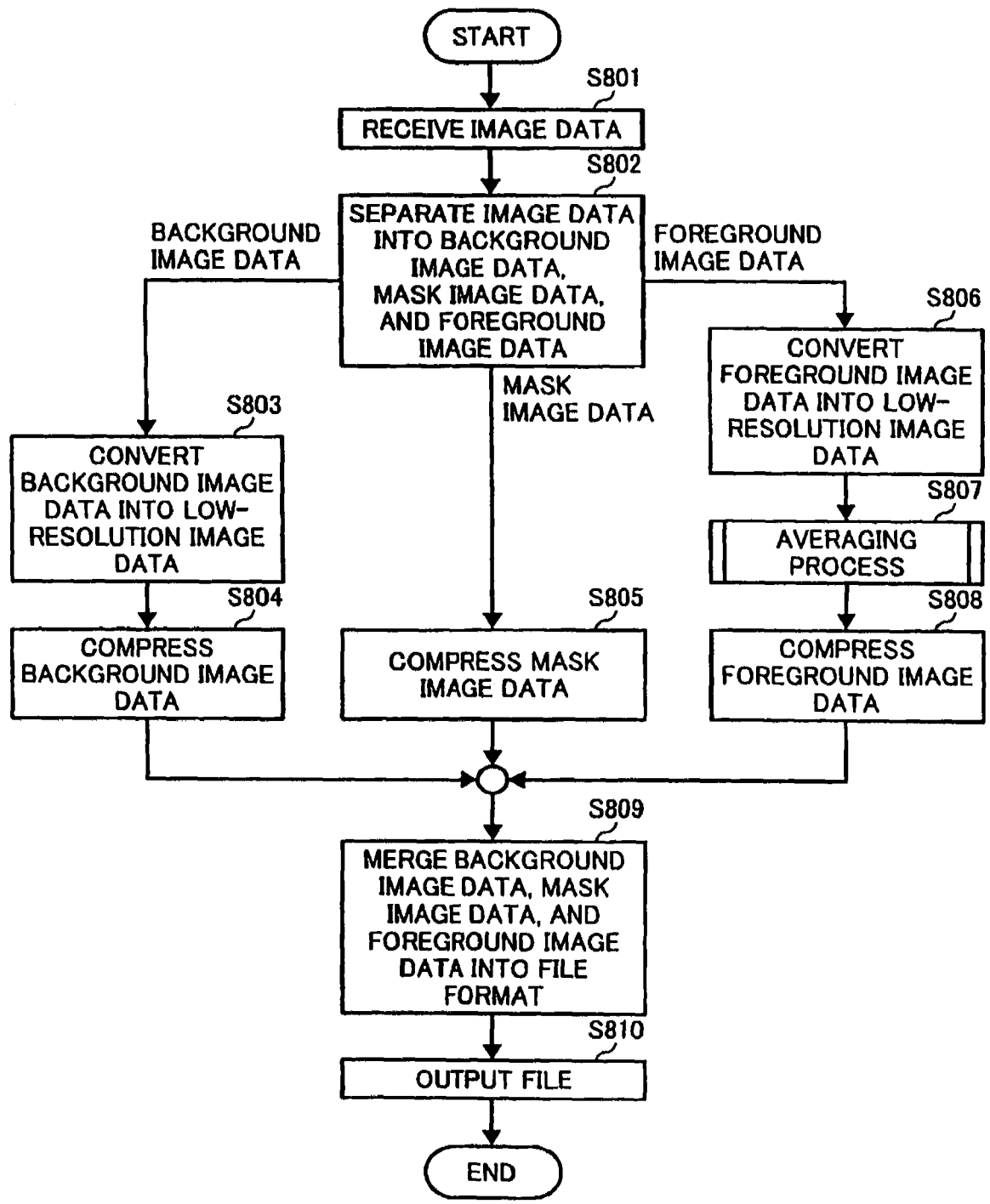
FIG. 8 is a flowchart of a process performed by the image processing apparatus shown in FIG. 1.

FIG. 8 is a flowchart of a process performed by the image processing apparatus 100 according to the first embodiment. It is assumed that image data of 300 dpi in the main and sub scanning directions is input to the image processing apparatus 100. The image separating unit 108 of the image processing apparatus 100 receives image data via the network or from the scanner unit.

Upon receiving the input image data (Step S801), the image separating unit 108 separates the input image data of 300 dpi in the main and sub scanning directions into background image data, mask image data, and foreground image data (Step S802). The background image data is multivalued image data on an image of an area of the input image data where a picture, a photo, or a pattern is included. The mask image data is binary image data including shape information of a text or a line image of the input image data. The foreground image data is multivalued image data including density/color information of the text or the line image.

The image separating unit 108 outputs the binary mask image data of 300 dpi in the main and sub scanning directions to the mask-image compressing unit 104. Upon receiving the binary mask image data, the mask-image compressing unit 104 performs lossless compression on the binary mask image data, for example, by the MMR coding method (Step S805). After that, the mask-image compressing unit 104 outputs the MMR-encoded mask image data to the merging unit 107.

On the other hand, the image separating unit 108 outputs the background image data of 300 dpi in the main and sub scanning directions to the background-image resolution converting unit 105. Upon receiving the background image data, the background-image resolution converting unit 105 converts the background image data into low-resolution image data (Step S803). For example, the background-image resolution converting unit 105 reduces the background image data by two thirds of the original size in the main and sub scanning directions equally, i.e., converts the background image data into low-resolution image data of 200 dpi in the main and sub scanning directions. After that, the background-image resolution converting unit 105 outputs the low-resolution background image data to the background-image compressing unit 106.

Upon receiving the low-resolution background image data of 200 dpi in the main and sub scanning directions, the background-image compressing unit 106 compresses the low-resolution background image data, for example, by the JPEG compression (Step S804). After that, the background-image compressing unit 106 outputs the (JPEG-encoded) background image data to the merging unit 107.

On the other hand, the image separating unit 108 outputs the foreground image data of 300 dpi in the main and sub scanning directions to the foreground-image resolution converting unit 101. Upon receiving the foreground image data, the foreground-image resolution converting unit 101 converts the foreground image data into low-resolution image data of 150 dpi in the main and sub scanning directions (Step S806). After that, the foreground-image resolution converting unit 101 outputs the low-resolution foreground image data of 150 dpi in the main and sub scanning directions to the averaging unit 102.

Upon receiving the low-resolution foreground image data, the averaging unit 102 performs the averaging process on the foreground image data on the basis of the 8×8 square block (Step S807). After that, the averaging unit 102 outputs the foreground image data to the foreground-image compressing unit 103. Upon receiving the foreground image data, the foreground-image compressing unit 103 compresses the foreground image data of 150 dpi in the main and sub scanning directions, for example, by the JPEG compression (Step S808). By the averaging process on the foreground image data, when the foreground-image compressing unit 103 performs JPEG compression on the foreground image data, it is possible to compress the foreground image data at a higher compression ratio. After that, the foreground-image compressing unit 103 outputs the (JPEG-encoded) foreground image data to the merging unit 107.

Upon receiving the (JPEG-encoded) foreground image data obtained at Step S808, the (MMR-encoded) mask image data obtained at Step S805, and the (JPEG-encoded) background image data obtained at Step S804, the merging unit 107 merges the (JPEG-encoded) foreground image data, the (MMR-encoded) mask image data, and the (JPEG-encoded) background image data in, for example, one PDF file as a structured document (Step S809). After that, the merging unit 107 outputs the PDF file to a storage unit (not shown) of the image processing apparatus 100 or a communication device connected via a network interface (I/F) (not shown) of the image processing apparatus 100 (Step S810).

When the image data in the PDF file is displayed, each of the (compressed) image data is expanded to have the same resolution, and then displayed. Specifically, the foreground image data is converted into high-resolution image data so as to have the same resolution as the mask image data, and the expanded foreground image data and the mask image data undergo a logical AND operation, whereby the text or the line image can be displayed while the density variation thereof is expressed. On the other hand, the background image data is converted into high-resolution image data so as to have the same resolution as the mask image data, and the picture or the photo included in the background image data is displayed on an image area of the mask image data having the pixel value of "0". In this manner, image data close to the original input image data can be displayed. Incidentally, the conversion into high-resolution image data is performed by using any known conversion method, such as the high-compression PDF conversion, and the description of the conversion method is omitted.

Figure 9:
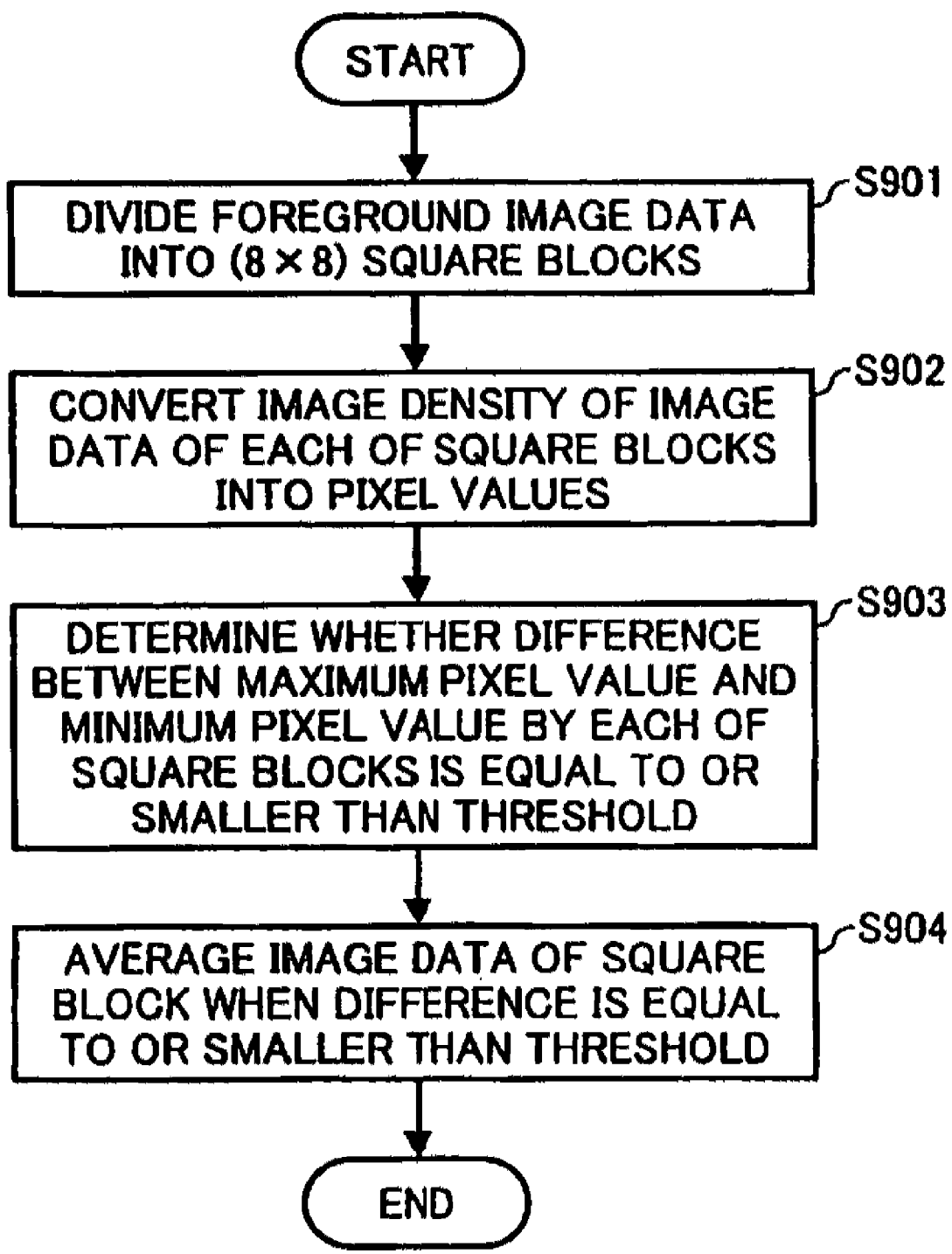
FIG. 9 is a flowchart of the averaging process performed by the averaging unit shown in FIG. 6.

Subsequently, the averaging process at Step S807 is explained in detail below with reference to a flowchart shown in FIG. 9.

First, upon receiving the low-resolution foreground image data, the first image dividing unit 601 divides the foreground image data into square blocks (composed of, for example, 8×8 pixels, respectively) (Step S901).

Then, the first block-image determining unit 602 converts the image density of foreground image data into pixel values (Step S902). Specifically, the first block-image determining unit 602 converts the image density of each pixel of each square block of the foreground image data into pixel values. The first block-image determining unit 602 calculates a difference between the maximum pixel value and the minimum pixel value by each of the square blocks, and determines whether the difference exceeds a predetermined threshold (Step S903).

The first block-image averaging unit 603 calculates an average pixel value of the square block if the difference is equal to or smaller than the threshold, and changes the pixel values of the square block to the average pixel value, and thereby averaging the image data of the square block (Step S904).

In the image processing apparatus 100, after foreground image data, including color information of a text or a line image, is divided into square blocks, pixel values of the square block to be averaged are changed to an average pixel value, and thereby averaging image data of the square block. Therefore, when the foreground image data is encoded or compressed, the foreground image data can be compressed at a higher compression ratio, and thus the data size can be reduced. Furthermore, only pixels corresponding to a text area of the foreground image data are reduced, so that the data size of the foreground image data can be reduced more efficiently. Moreover, the image density of the text area is maintained even when the pixels corresponding to the text area are reduced, so that the visibility of the text can be kept sufficiently high.

Furthermore, in the image processing apparatus 100, only when a difference between the maximum pixel value and the minimum pixel value by each of square blocks of foreground image data is equal to or smaller than a predetermined threshold, image data of the corresponding square block is averaged. Therefore, it is possible to perform the encoding process or the compression process only on the foreground image data without performing the averaging process on a portion of which where a degree of density variation is high. Thus, the decrease in image quality can be reduced as much as possible.

In the first embodiment, when a difference between the maximum pixel value and the minimum pixel value of each of square blocks of foreground image data exceeds a predetermined threshold, the averaging process is not performed on image data of the corresponding square block. In an image processing apparatus 200 according to a second embodiment of the present invention, when the difference exceeds the threshold, the corresponding square block is subdivided into smaller square blocks, and the averaging process is performed by the smaller square blocks. The difference between the image processing apparatus 200 and the image processing apparatus 100 is that the image processing apparatus 200 includes an averaging unit 1000 instead of the averaging unit 102. The portions identical to those in FIG. 1 are denoted with the same reference numerals, and the description of those portions is omitted.

Figure 10:
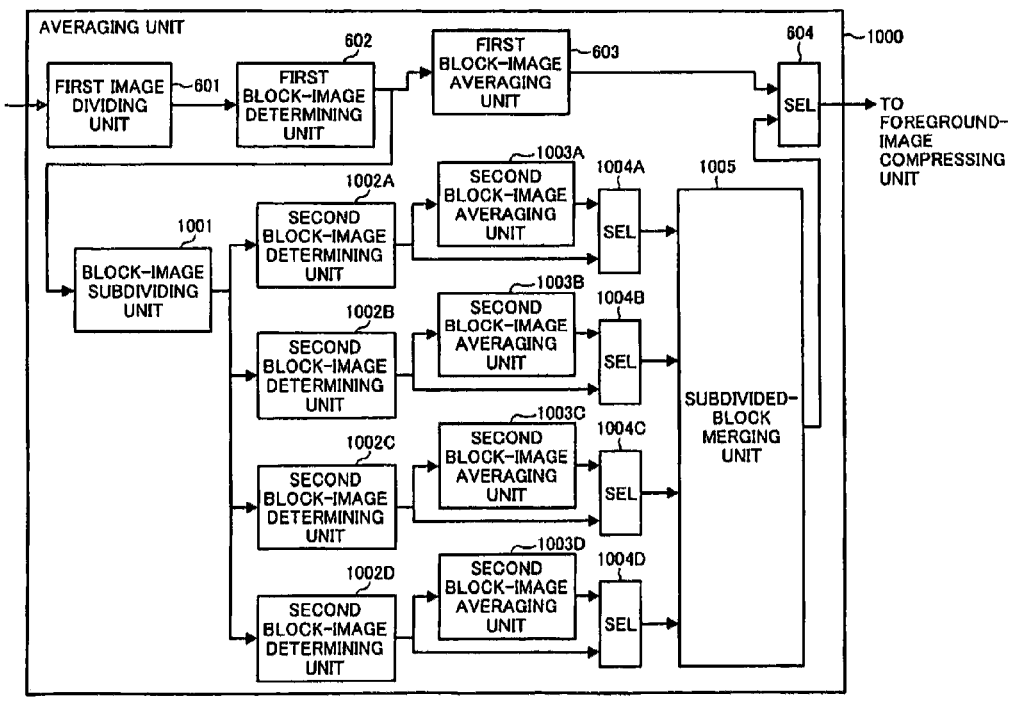
FIG. 10 is a block diagram of an averaging unit included in an image processing apparatus according to a second embodiment of the present invention.

FIG. 10 is a functional block diagram of the averaging unit 1000. The averaging unit 1000 includes a block-image subdividing unit 1001, four second block-image determining units 1002 (1002A to 1002D), four second block-image averaging units 1003 (1003A to 1003D), four selectors (denoted by "SEL" in FIG. 10) 1004 (1004A to 1004D), and a subdivided-block merging unit 1005 in addition to the first image dividing unit 601, the first block-image determining unit 602, the first block-image averaging unit 603, and the selector (denoted by "SEL" in FIG. 10) 604.

In the same manner as in the first embodiment, the first block-image determining unit 602 extracts the maximum pixel value and the minimum pixel value of each of square blocks of foreground image data. After that, the first block-image determining unit 602 calculates a difference between the maximum pixel value and the minimum pixel value, and determines whether the difference exceeds a predetermined threshold. When determining that the difference exceeds the threshold, the first block-image determining unit 602 outputs image data of the corresponding square block to the block-image subdividing unit 1001.

Upon receiving the image data of the square block, the block-image subdividing unit 1001 subdivides the image data of the square block into smaller square blocks. For example, when the square block is composed of 8×8 pixels, the block-image subdividing unit 1001 subdivides the image data of the 8×8 square block into four smaller square blocks composed of 4×4 pixels (hereinafter, "4×4 square blocks"). The block-image subdividing unit 1001 outputs image data of one of the 4×4 square blocks to each of the second block-image determining units 1002A to 1002D.

The second block-image determining units 1002A to 1002D store therein a predetermined threshold (hereinafter, "a second threshold"). The second threshold can be set to be the same or different from the threshold used by the first block-image determining unit 602. Upon receiving the image data of the corresponding 4×4 square block, each of the second block-image determining units 1002A to 1002D calculates a difference between the maximum pixel value and the minimum pixel value of the 4×4 square block, and determines whether the difference exceeds the second threshold. When it is determined that the difference exceeds the second threshold, the averaging process is not performed on image data of the 4×4 square block. In this case, the second block-image determining units 1002A to 1002D output the image data of the corresponding 4×4 square block to the selectors 1004A to 1004D, respectively. On the other hand, when it is determined that the difference is equal to or smaller than the second threshold, the averaging process is performed on the image data of the 4×4 square block.

When the difference is equal to or smaller than the second threshold, the second block-image determining units 1002A to 1002D output the image data of the corresponding 4×4 square block to the second block-image averaging units 1003A to 1003D, respectively. Upon receiving the image data of the 4×4 square block, the second block-image averaging units 1003A to 1003D respectively calculate an average pixel value of the 4×4 square block, and change pixel values of the 4×4 square block to the calculated average pixel value thereby averaging the image data. After that, the second block-image averaging units 1003A to 1003D output the averaged image data of the 4×4 square block to the selectors 1004A to 1004D, respectively.

Each of the selectors 1004A to 1004D selects any of the averaged image data of the 4×4 square block received from the corresponding second block-image averaging unit 1003 and the image data of the 4×4 square block received from the corresponding second block-image determining unit 1002, and outputs the selected image data of the 4×4 square block to the subdivided-block merging unit 1005. Incidentally, the selection method used by the selectors 1004A to 1004D is identical to that is used by the selector 604, and the description of the selection method is omitted.

Upon receiving four sets of the image data of the 4×4 square blocks from the selectors 1004A to 1004D, the subdivided-block merging unit 1005 merges the four sets of the image data into one set of image data of an 8×8 square block, and outputs the image data of the 8×8 square block to the selector 604.

In this manner, in the image processing apparatus 200, when image data of an 8×8 square block significantly varies in image density, the 8×8 square block is subdivided into four 4×4 square blocks. The second block-image determining units 1002A to 1002D respectively determine whether image data of the corresponding 4×4 square block significantly varies in image density. When it is determined that the image data of the 4×4 square block significantly varies in image density, the averaging process is not performed on the image data of the 4×4 square block. Therefore, it is possible to avoid performing the averaging process on a portion of foreground image data where a degree of density variation is high. In other words, it is possible to determine whether to perform the averaging process on the foreground image data on the basis of the 4×4 square block.

Furthermore, in the second embodiment, the averaging unit 1000 performs the averaging process on the 4×4 square blocks that an 8×8 square block is subdivided. As a result, it is possible to compress the foreground image data at a higher compression ratio than that is in the first embodiment in which the averaging process is not performed on image data of an 8×8 square block when the image data of the 8×8 square block has a high degree of density variation.

Subsequently, how an 8×8 square block is subdivided into four 4×4 square blocks is explained below. When the first block-image determining unit 602 determines that image data of the 8×8 square block has a high degree of density variation, the first block-image determining unit 602 outputs the image data of the 8×8 square block to the block-image subdividing unit 1001.

Figure 11:
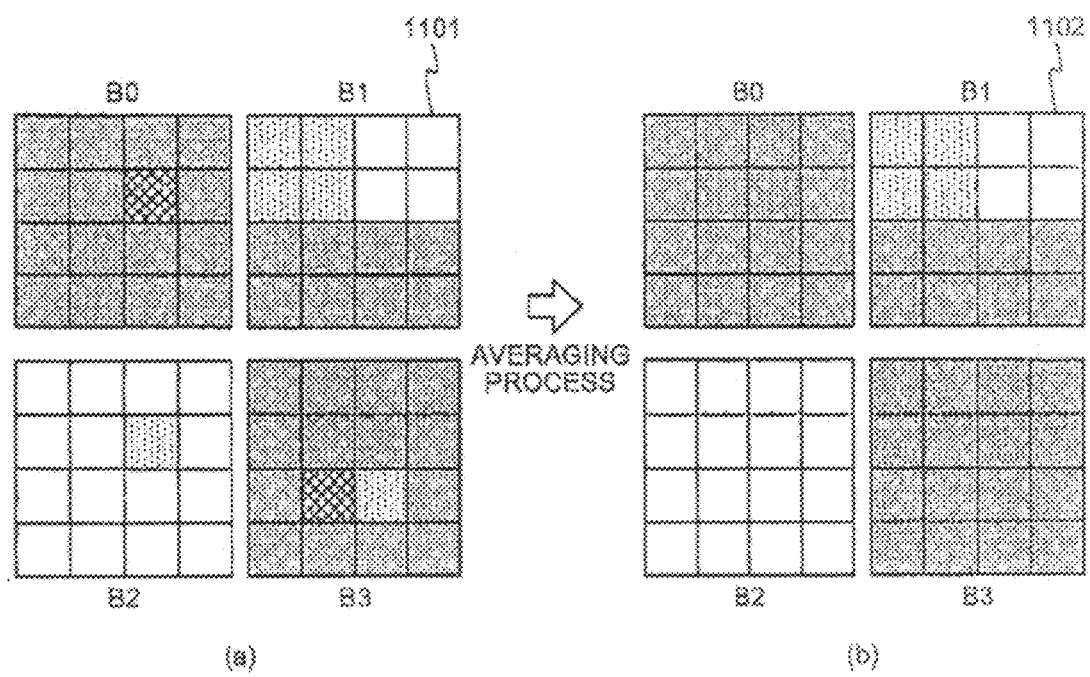
FIG. 11 is an explanatory diagram of an averaging process performed on a 4×4 square block by the averaging unit shown in FIG. 10.

Subsequent procedures are explained with reference to FIG. 11. FIG. 11 is an explanatory diagram of the averaging process performed on image data of a 4×4 square block. Upon receiving image data of an 8×8 square block, the block-image subdividing unit 1001 subdivides the 8×8 square block into four 4×4 square blocks B0 to B3 (see an example of image data (a) shown in FIG. 11).

The second block-image determining units 1002A to 1002D respectively determine whether a difference between the maximum pixel value and the minimum pixel value of the corresponding 4×4 square block exceeds the second threshold. When the difference is equal to or smaller than the second threshold, the corresponding second block-image averaging unit 1003 averages the image data of the 4×4 square block.

Each of the selectors 1004A to 1004D selects any of the averaged image data of the 4×4 square block received from the corresponding second block-image averaging unit 1003 and the image data of the 4×4 square block, which is not averaged, received from the corresponding second block-image determining unit 1002 based on a result of the determination of the corresponding second block-image determining unit 1002, and outputs the selected image data of the 4×4 square block to the subdivided-block merging unit 1005.

In the example of the image data (a) shown in FIG. 11, it is determined that only image data of the 4×4 square block B1 (denoted with a reference numeral 1101) has a high degree of density variation (i.e., a difference between the maximum pixel value and the minimum pixel value of the 4×4 square block B1 exceeds the second threshold) and the other 4×4 square blocks B0, B2, and B3 have a low degree of density variation. Therefore, the second block-image averaging units 1003A, 1003C, and 1003D perform the averaging process on image data of the 4×4 square blocks B0, B2, and B3, respectively (see an example of image data (b) shown in FIG. 11). The image data of the 4×4 square block B1 is output without being averaged (see the 4×4 square block B1 denoted with a reference numeral 1102 in the image data (b)).

The subdivided-block merging unit 1005 merges received four sets of image data of the 4×4 square blocks into one set of image data of an 8×8 square block, and outputs the image data of the 8×8 square block to the selector 604. After that, in the same manner as in the first embodiment, the selector 604 selects image data based on a result of the determination by the first block-image determining unit 602 and the like, and outputs the selected image data. In this manner, in the image processing apparatus 200, when the averaging process is not performed on image data of an 8×8 square block because it is determined that the image data of the 8×8 square block has a high degree of density variation, the image data of the 8×8 square block is subdivided into four 4×4 square blocks. Then, the averaging process is performed on image data of each of the 4×4 square blocks when the image data of the 4×4 square block does not have a high degree of density variation. Therefore, when the foreground image data is compressed, for example, by the JPEG compression in the subsequent stage, it is possible to increase a compression ratio higher than that is in the first embodiment. Furthermore, when a difference between the maximum pixel value and the minimum pixel value of each of the 4×4 square blocks exceeds the second threshold, the averaging process is not performed on image data of the corresponding 4×4 square block. Therefore, it is possible to maintain the image density of a portion of the foreground image data where a degree of density variation is high.

Figure 12B:
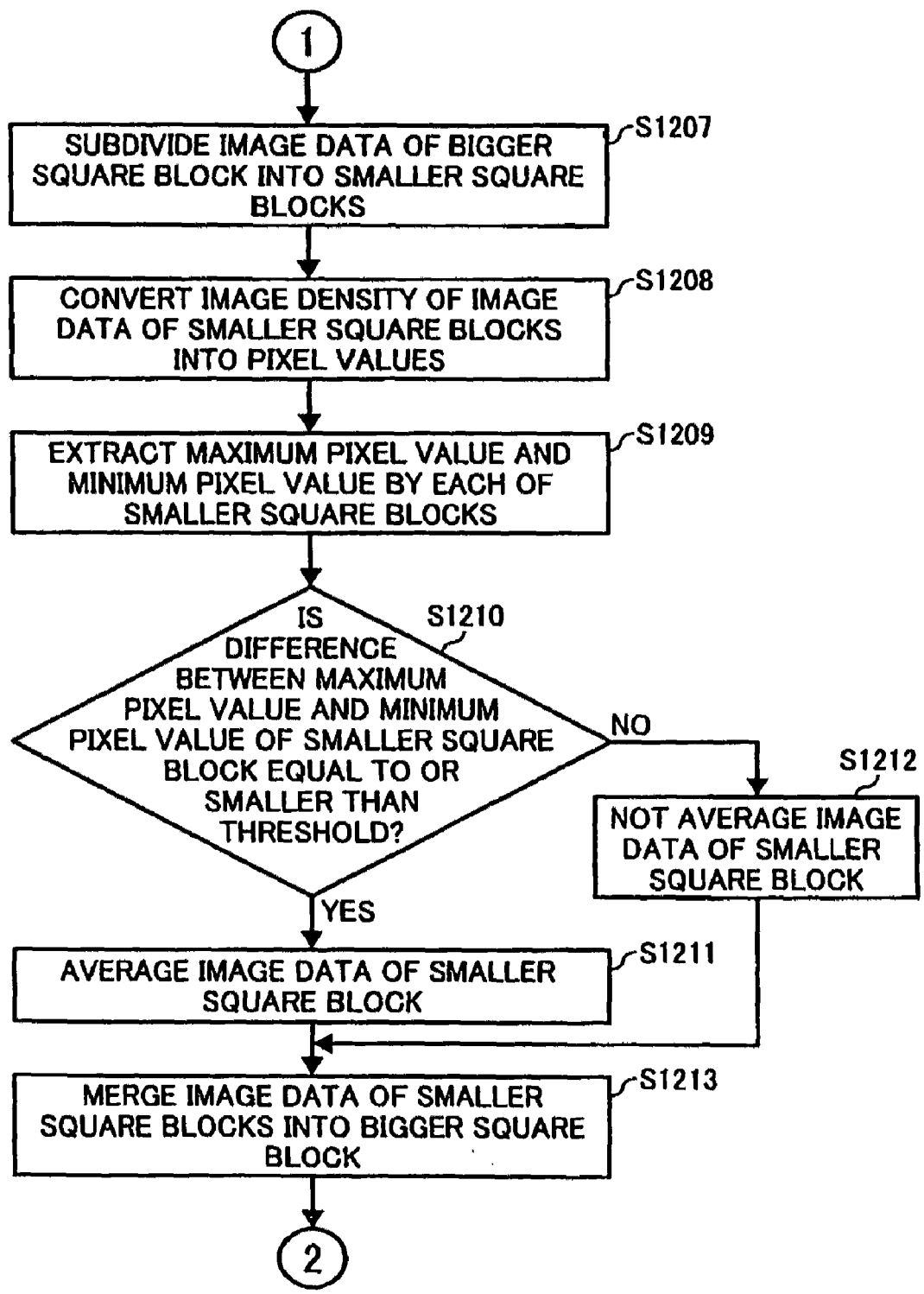
FIG. 12 is a flowchart of the averaging process performed by the averaging unit shown in FIG. 10.

FIG. 12 is a flowchart of the averaging process performed by the averaging unit 1000.

First, the first image dividing unit 601 divides an image area of the foreground image data into bigger (8×8) square blocks (Step S1201).

Then, the first block-image determining unit 602 converts the image density of image data of each of the bigger square blocks into pixel values (Step S1202), and extracts the maximum pixel value and the minimum pixel value by each of the bigger square blocks (Step S1203).

The first block-image determining unit 602 calculates a difference between the maximum pixel value and the minimum pixel value of each of the bigger square blocks, and determines whether the difference is equal to or smaller than the threshold (Step S1204).

When determining that the difference exceeds the threshold (NO at Step S1204), the first block-image determining unit 602 outputs the image data of the bigger square block to the block-image subdividing unit 1001. The block-image subdividing unit 1001 subdivides the image data of the bigger square block into smaller (four 4×4) square blocks (Step S1207). The block-image subdividing unit 1001 outputs image data of one of the smaller square blocks to each of the second block-image determining units 1002A to 1002D.

The second block-image determining units 1002A to 1002D respectively convert the image density of the image data of the corresponding smaller square block into pixel values (Step S1208), and extracts the maximum pixel value and the minimum pixel value of the corresponding smaller square block (Step S1209). The second block-image determining units 1002A to 1002D respectively calculate a difference between the maximum pixel value and the minimum pixel value of the corresponding smaller square block, and determines whether the difference is equal to or smaller than the second threshold (Step S1210).

When determining that the difference is equal to or smaller than the second threshold (YES at Step S1210), each of the second block-image determining units 1002A to 1002D outputs the image data of the corresponding smaller square block to the corresponding second block-image averaging unit 1003. Upon receiving the image data of the smaller square block, each of the second block-image averaging units 1003A to 1003D averages pixel values of the corresponding smaller square block, and thereby averaging the image data of the smaller square block (Step S1211).

On the other hand, when determining that the difference exceeds the second threshold (NO at Step S1210), each of the second block-image determining units 1002A to 1002D outputs the image data of the corresponding smaller square block to the corresponding selector 1004, i.e., each of the second block-image averaging units 1003A to 1003D does not perform the averaging process on the image data of the smaller square block (Step S1212).

Upon receiving all of image data of the smaller square blocks from the selectors 1004A to 1004D, i.e., any of the image data of the smaller square block averaged at Step S1211 and the image data of the smaller square block not-averaged at Step S1212, the subdivided-block merging unit 1005 merges all the image data of the smaller square blocks into one set of image data of bigger square block (Step S1213). The image data of the bigger square block is output to the foreground-image compressing unit 103 via the selector 604.

On the other hand, when the first block-image determining unit 602 determines that the difference is equal to or smaller than the threshold (YES at Step S1204), the first block-image determining unit 602 outputs the image data of the bigger square block to the first block-image averaging unit 603. Upon receiving the image data of the bigger square block, the first block-image averaging unit 603 averages the image data of the bigger square block (Step S1205). The averaged image data of the bigger square block is output to the foreground-image compressing unit 103 via the selector 604.

In this manner, in the image processing apparatus 200, the averaging process is not performed on a portion of the foreground image data where the image density significantly varies, and thus the encoding process can be performed on the foreground image data other than the portion.

Furthermore, in the image processing apparatus 200, a difference between the maximum pixel value and the minimum pixel value of each of square blocks that an image area of the foreground image data is divided thereinto is calculated, and when the difference is equal to or smaller a predetermined threshold, the averaging process is performed on the image data of the square block. Therefore, it is possible to determine whether to perform the averaging process on image data of each of the square blocks based on the difference. Moreover, in the image processing apparatus 200, when image data of the 8×8 (bigger) square block has a high degree of density variation, the image data of the 8×8 square block is subdivided into four 4×4 (smaller) square blocks so that the averaging process can be performed on the basis of the 4×4 square block. Therefore, the foreground image data can be compressed at a higher compression ratio than that is in the first embodiment.

Furthermore, in the image processing apparatus 200, when a difference between pixel values included in the smaller square block is large, the averaging process is not performed on image data of the smaller square block. Therefore, a portion of the original image data where a degree of color density is high can be maintained without change. Thus, the decrease in image quality of the image data can be reduced as much as possible.

In an image processing apparatus 300 according to a third embodiment of the present invention, a filtering process is performed on foreground image data after an 8×8 (bigger) square block is subdivided into four 4×4 (smaller) square blocks, and the averaging process is performed by the 4×4 square block, and then four sets of image data of the 4×4 square blocks are merged into one set of image data of the 8×8 square block in the same manner as in the second embodiment.

Figure 13:
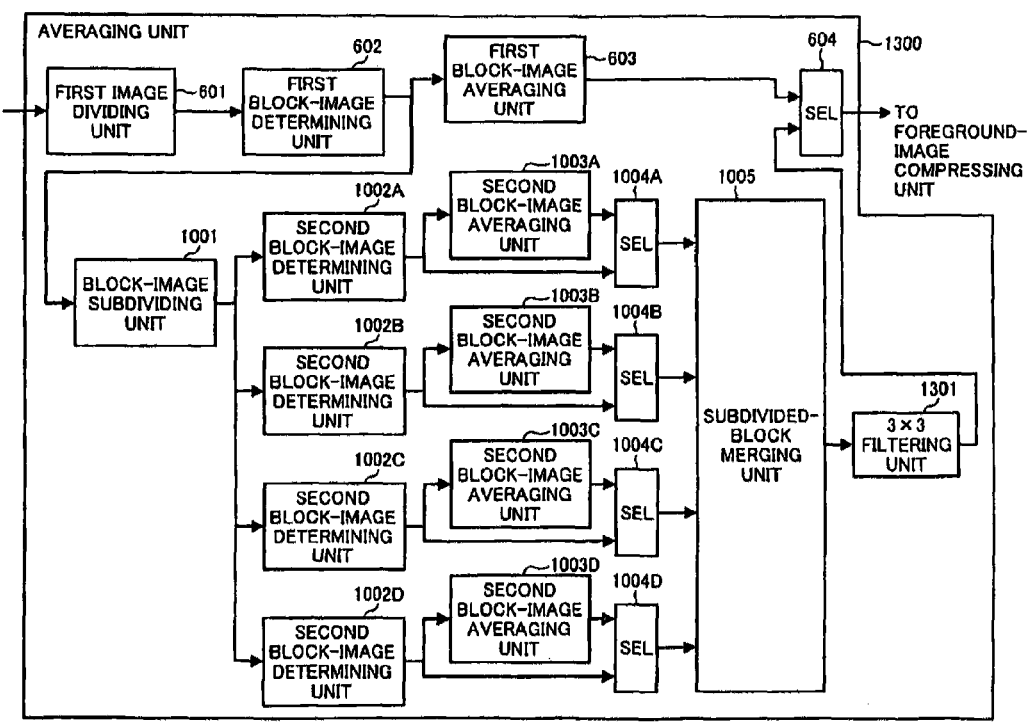
FIG. 13 is a block diagram of an averaging unit included in an image processing apparatus according to a third embodiment of the present invention.

FIG. 13 is a block diagram of an averaging unit 1300 included in the image processing apparatus 300. The difference between the averaging unit 1300 and the averaging unit 1000 is that the averaging unit 1300 further includes a 3×3 filtering unit 1301. The portions identical to those in FIG. 10 are denoted with the same reference numerals, and the description of those portions is omitted.

The 3×3 filtering unit 1301 performs a filtering process on image data of an 8×8 (bigger) square block into which four sets of image data of 4×4 (smaller) square blocks are merged by the subdivided-block merging unit 1005. By the filtering process, the JPEG compression in the subsequent stage can be performed more effectively.

There is explained an example how the JPEG compression is performed effectively. FIG. 14 depicts an example of a 3×3 filter used by the 3×3 filtering unit 1301. FIG. 15 is an explanatory diagram of the filtering process performed on merged image data of an 8×8 square block with the 3×3 filter shown in FIG. 14. It is assumed that after image data of an 8×8 square block is subdivided into four 4×4 square blocks B0 to B3, and the averaging process is performed on the 4×4 square blocks, and then four sets of averaged image data of the 4×4 square blocks B0 to B3 are merged into one set of image data (a) of the 8×8 square block image data shown in FIG. 15. Incidentally, the image data (a) is illustrated in the form of four sets of image data of the 4×4 square blocks B0 to B3 so as to be visually perceived.

The 3×3 filtering unit 1301 performs the filtering process on the image data (a) of the 8×8 square block with the 3×3 filter shown in FIG. 14. As a result, image data (b) of an 8×8 square block shown in FIG. 15 is obtained. The image data (b) is also illustrated in the form of four sets of image data of the 4×4 square blocks B0 to B3 so as to be visually perceived. In the image data (a) before the filtering process is performed thereon, there is a significant difference in density, for example, between the 4×4 square blocks B0 and B2. The JPEG compression is not suitable for compression of image data having such a significant difference in density (i.e., an edge), so that the 3×3 filtering unit 1301 performs the 3×3 filtering process on the image data (a) of the 8×8 square block thereby smoothing the edge. Thus, it is possible to prevent the decrease in JPEG compression ratio due to the edge between the 4×4 square blocks.

In this manner, in the averaging unit 1300, the filtering process is performed on foreground image data after the averaging process on the basis of the 8×8 square block and the averaging process on the basis of the 4×4 square block that the 8×8 square block is subdivided are performed, and thereby increasing the JPEG compression ratio of image data of each of the 8×8 square blocks of the foreground image data. These processes are performed on the foreground image data only. This is because, for example, when the foreground image data, the background image data, and the mask image data are finally merged into a PDF file, to display text image data while the density variation thereof is expressed, the compressed foreground image data is expanded to have the same resolution as the mask image data, and the expanded foreground image data and the mask image data undergo a logical AND operation. The edge information is preserved in the mask image data, so that the foreground image data need not include a lot of density/color information of a text or a line image, as compared with the background image data or the mask image data. Therefore, the above processes are effective in the foreground image data. On the other hand, information on the density variation is important for the background image data including an image of a picture or a photo. If all the processes are performed on the background image data, it may cause the decrease in image quality. Such a variation in color density is not important for the text, so that the processes are performed on the foreground image data, whereby the text is recognizably uniformized. The same holds true for the first and second embodiments.

In the image processing apparatus 300, after four sets of image data of 4×4 square blocks are merged into one set of image data of an 8×8 square block, the filtering process is performed on the image data of the 8×8 square block. Therefore, it is possible to smooth edges between the multiple 4×4 square blocks, and thus the foreground image data can be compressed at a higher compression ratio.

In the third embodiment, processing on the foreground image data is performed on the 8×8 square block. Therefore, it is highly likely that edges of a text or a line image are prominent in boundaries between the 8×8 square blocks. Therefore, an image processing apparatus 400 according to a fourth embodiment of the present invention is configured to process edges of a text or a line image not to be prominent in boundaries between the 8×8 square blocks.

Figure 16:
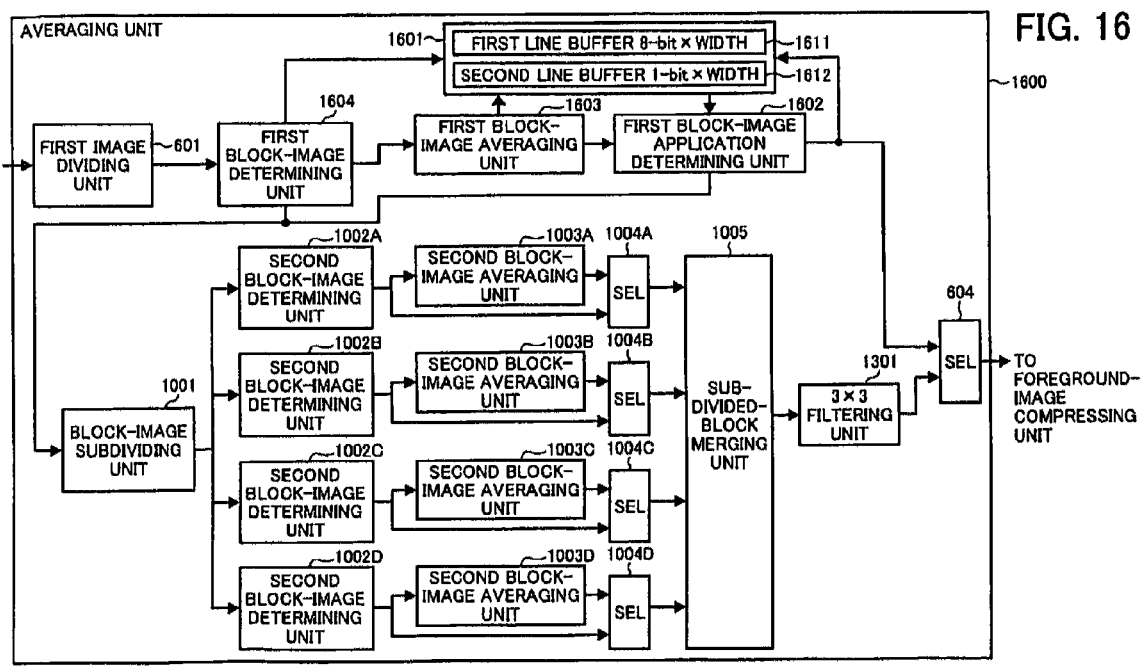
FIG. 16 is a block diagram of an averaging unit included in an image processing apparatus according to a fourth embodiment of the present invention.

FIG. 16 is a block diagram of an averaging unit 1600 included in the image processing apparatus 400. The difference between the averaging unit 1600 and the averaging unit 1300 is that the averaging unit 1600 includes a first block-image determining unit 1604 instead of the first block-image determining unit 602 and a first block-image averaging unit 1603 instead of the first block-image averaging unit 603, and further includes a line buffer group 1601 and a first block-image application determining unit 1602. The portions identical to those in FIG. 13 are denoted with the same reference numerals, and the description of those portions is omitted.

Figure 17:
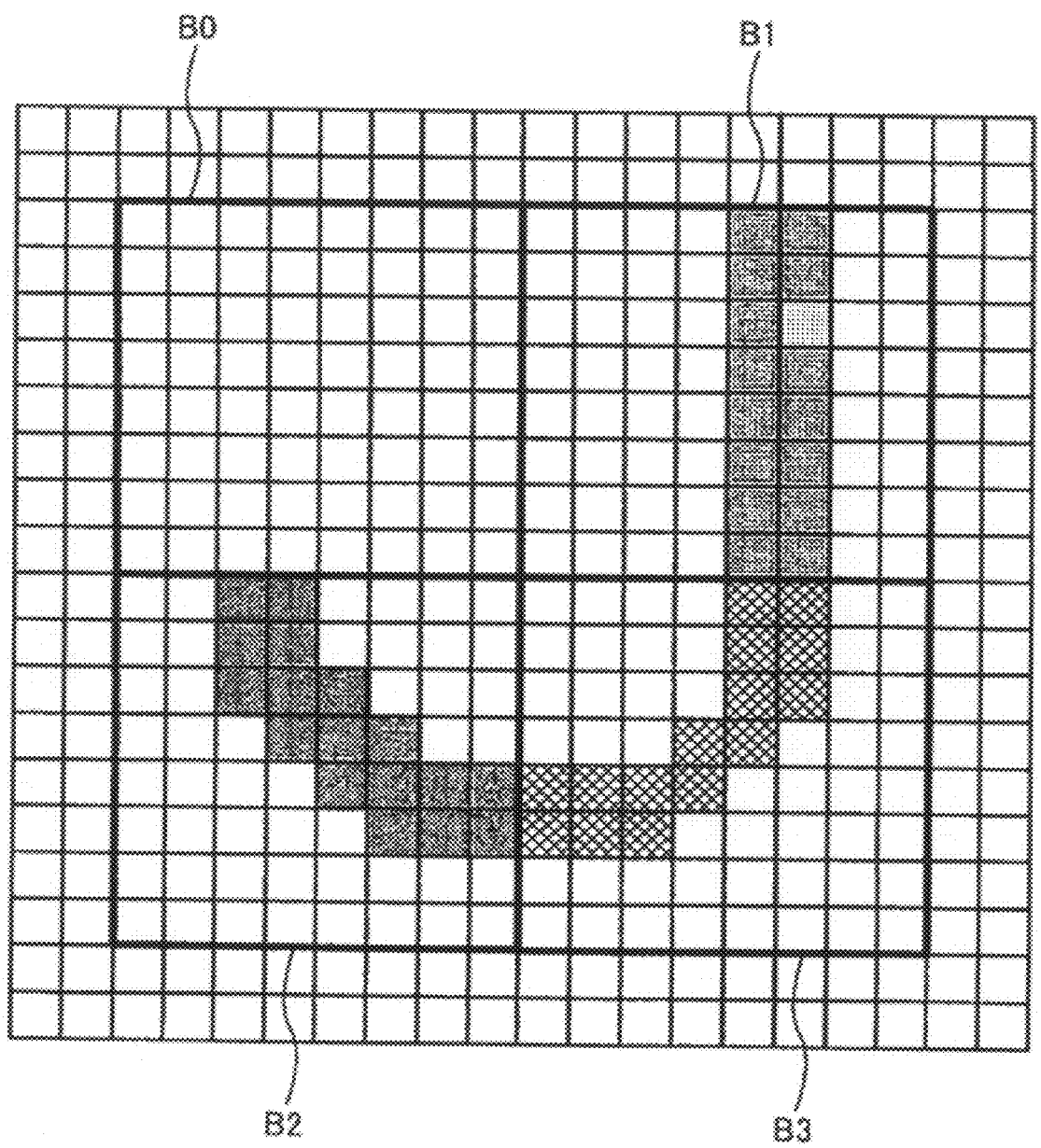
FIG. 17 shows an example of foreground image data in which edges arise at boundaries between 8×8 square blocks.

FIG. 17 depicts an example of foreground image data after the averaging process is performed thereon. To increase an efficiency of the JPEG compression, the averaging process is performed on the foreground image data on the basis of the 8×8 square block. In the example shown in FIG. 17, one character ("J") spans over a plurality of 8×8 square blocks B1 to B3. By performing the averaging process on the foreground image data shown in FIG. 17, edges arise at boundaries between the 8×8 square blocks B1 to B3, so that a user may determine the foreground image data as an error image.

To avoid occurring such a problem, the averaging unit 1600 does not perform the averaging process on image data of the 8×8 square block B3. The image data of the 8×8 square block B3 is subdivided into four 4×4 square blocks so that the averaging unit 1600 is performed on the basis of the 4×4 square block, and thereby reducing a difference in density between the 8×8 square block B3 and the adjacent 8×8 square blocks B2 and B1.

To return to the explanation of FIG. 16, the line buffer group 1601 includes a first line buffer 1611 and a second line buffer 1612.

The first line buffer 1611 is an 8-bit×width (horizontal width of image data) line buffer. The first line buffer 1611 stores therein average pixel values of each of 8×8 square blocks included in previous one line just before the a target 8×8 square block to be averaged. If an average pixel value of any of the 8×8 square blocks has not been calculated, the first line buffer 1611 stores therein an improbable pixel value, such as "−1" as the average pixel value of the corresponding 8×8 square block.

The second line buffer 1612 is a 1-bit×width line buffer. The second line buffer 1612 stores therein flags indicating whether the averaging process is performed on image data of each of the 8×8 square blocks included in previous one line just before the target 8×8 square block to be averaged. For example, when image data of the 8×8 square block is subdivided into four 4×4 square blocks, or when the averaging process is not performed on image data of the 8×8 square block, a flag indicating "not implemented" meaning that the averaging process is not performed on the basis of the 8×8 square block is set.

The first block-image determining unit 1604 has the same function as the first block-image determining unit 602. In addition, when the first block-image determining unit 1604 determines that a difference between pixel values of each of the 8×8 square blocks exceeds a predetermined threshold, the first block-image determining unit 1604 sets an improbable pixel value in the first line buffer 1611 as the average pixel value of the corresponding 8×8 square block, and sets a flag indicating "not implemented" in the second line buffer 1612.

The first block-image averaging unit 1603 performs the averaging process in the same manner as the first block-image averaging unit 603. After performing the averaging process, the first block-image averaging unit 1603 writes the calculated average pixel value on the first line buffer 1611. Furthermore, the first block-image averaging unit 1603 outputs the averaged image data of the 8×8 square block and the image data of the 8×8 square block before the averaging process is performed thereon to the first block-image application determining unit 1602.

The first block-image application determining unit 1602 compares the average pixel value calculated by the first block-image averaging unit 1603 with the average pixel values stored in the first line buffer 1611, and determines whether to subdivide the image data of the 8×8 square block based on a result of the comparison. When determining to subdivide the image data of the 8×8 square block, the first, block-image application determining unit 1602 outputs the image data of the 8×8 square block to the block-image subdividing unit 1001. The processes in the subsequent stages are identical to those in the third embodiment, and the description of those portions is omitted.

Figure 18A:
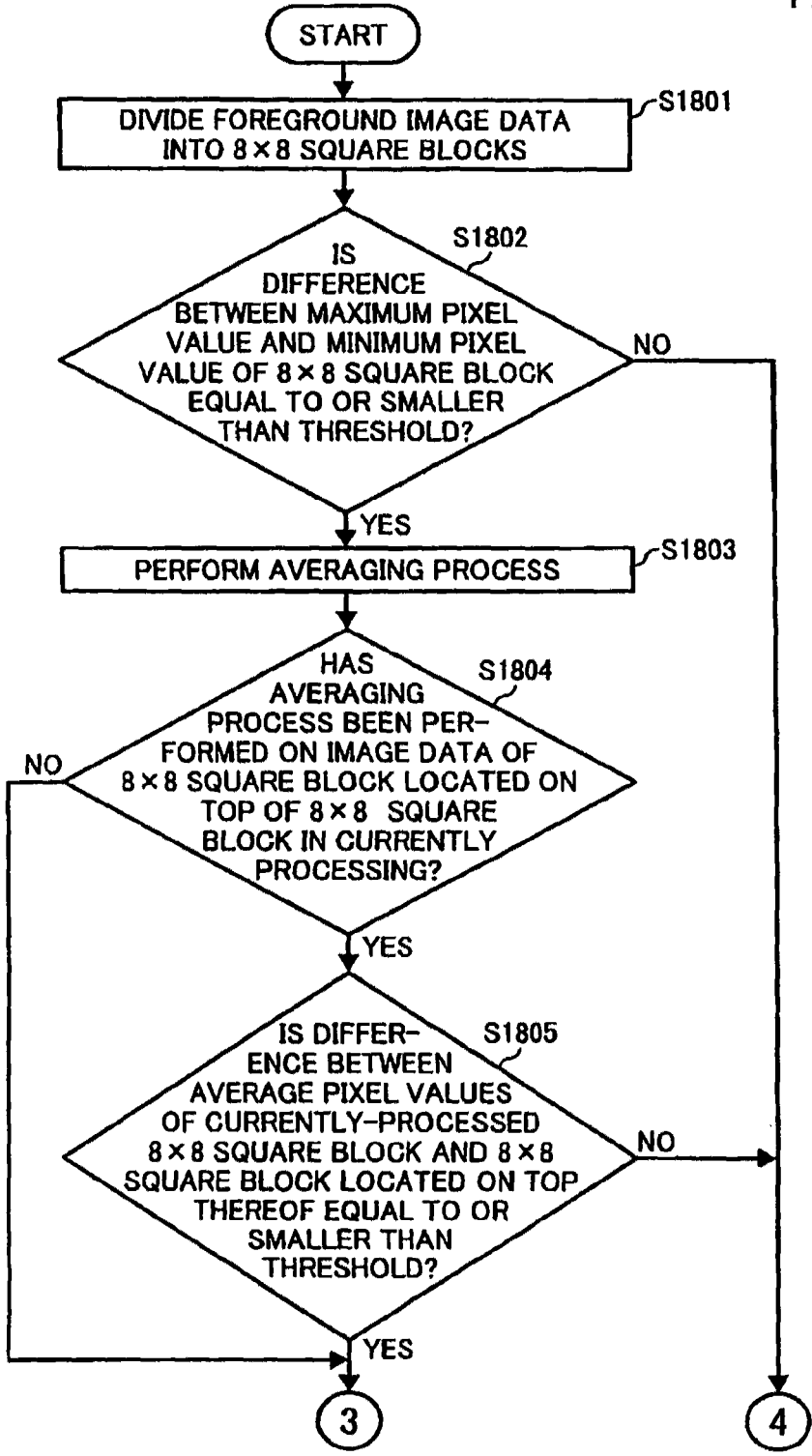
FIG. 18 is a flowchart of an averaging process performed by the averaging unit shown in FIG. 16.
Figure 18B:
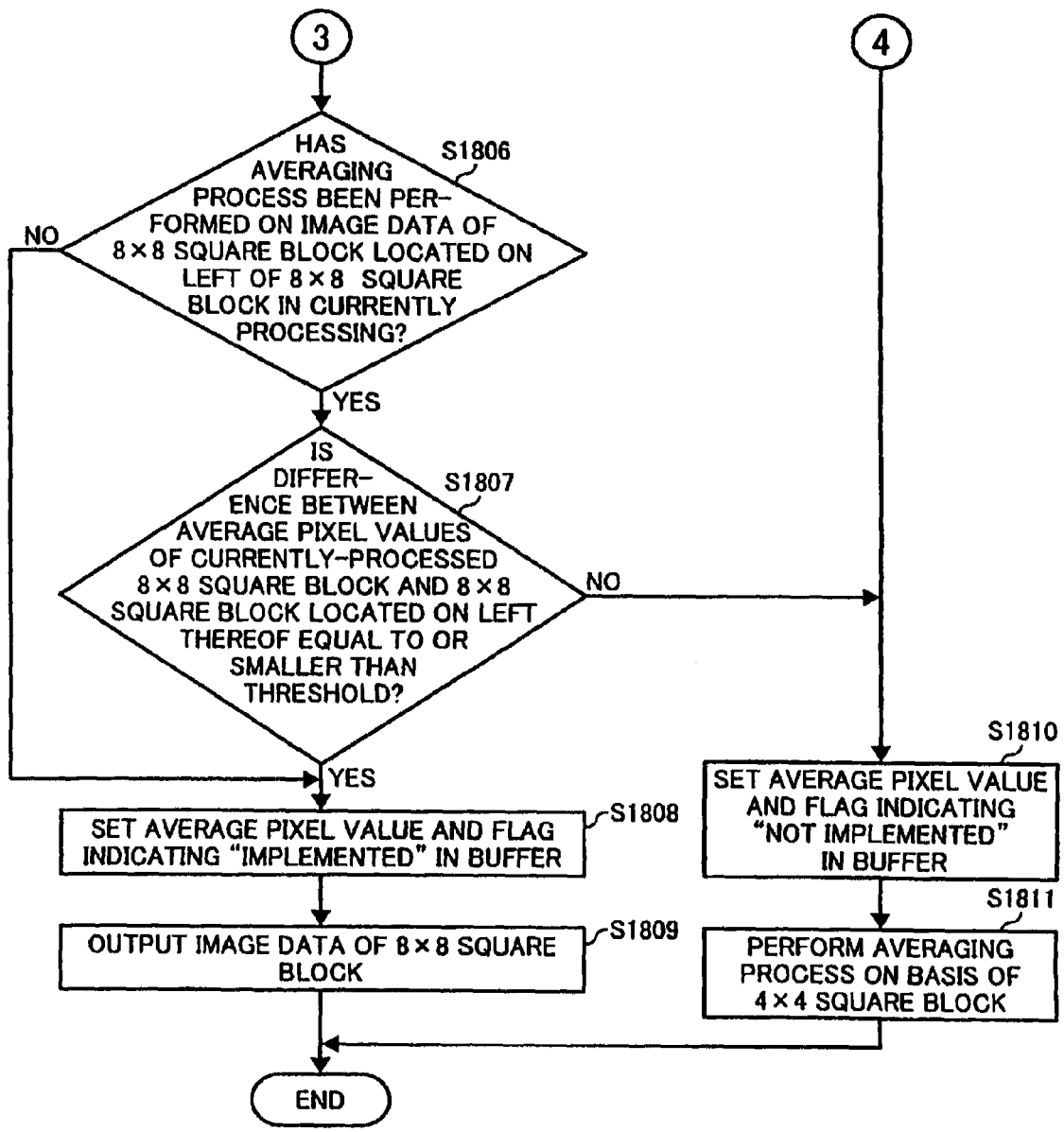

Subsequently, the averaging process performed by the averaging unit 1600 is explained below with reference to a flowchart shown in FIG. 18.

It is assumed that image data of the 8×8 square block B3 shown in FIG. 17 is subject for the averaging process. In this case, processing results (i.e., an average pixel value and whether the averaging process has been performed or not) of the 8×8 square blocks B2 and B1 are input to the first block-image application determining unit 1602. This is because the first block-image application determining unit 1602 controls the 8×8 square block B3 to prevent an edge from arising at the boundary between the 8×8 square blocks B2 and B3 and the boundary between the 8×8 square blocks B1 and B3.

First, the first image dividing unit 601 divides an image area of the foreground image data into 8×8 square blocks including the 8×8 square blocks B1 to B3 (Step S1801). Then, the first block-image determining unit 1604 determines whether a difference between the maximum pixel value and the minimum pixel value of the 8×8 square block B3 subject for the averaging process is equal to or smaller than the threshold (Step S1802). When determining that the difference exceeds the threshold (NO at Step S1802), the first block-image determining unit 1604 determines to subdivide image data of the 8×8 square block B3 into four 4×4 square blocks. The first block-image determining unit 1604 outputs the image data of the 8×8 square block B3 to the block-image subdividing unit 1001, and sets an improbable pixel value as the average pixel value of the 8×8 square block B3 in the first line buffer 1611, and also sets a flag of the 8×8 square block B3 as "not implemented" in the second line buffer 1612 (Step S1810). After that, the averaging process on the basis of the 4×4 square block is performed (Step S1811). The averaging process at Step S1811 is identical to Steps S1207 to S1213 shown in FIG. 12, and the description of Step S1811 is omitted. In the present embodiment, after averaging process is performed on the image data of the 8×8 square block B3 on the basis of the 4×4 square block, the 3×3 filtering process is performed on the image data of the 8×8 square block B3.

On the other hand, when the first block-image determining unit 1604 determines that the difference is equal to or smaller than the threshold (YES at Step S1802), the first block-image averaging unit 1603 performs the averaging process on the image data of the 8×8 square block B3 (Step S1803). The first block-image averaging unit 1603 outputs both the image data of the 8×8 square block B3 averaged at Step S1803 and the original image data of the 8×8 square block B3, i.e., before the averaging process is performed thereon to the first block-image application determining unit 1602.

Upon receiving the two sets of image data of the 8×8 square block B3, the first block-image application determining unit 1602 determines whether the averaging process has been performed on image data of the 8×8 square block B1 located on the top of the 8×8 square block B3 by reading out a flag of the 8×8 square block B1 from the second line buffer 1612 (Step S1804). When it is determined that the averaging process has not been performed on the image data of the 8×8 square block B1 (NO at Step S1804), the process control goes to Step S1806.

On the other hand, when it is determined that the averaging process has been performed on the image data of the 8×8 square block B1 (YES at Step S1804), the first block-image application determining unit 1602 reads out the average pixel value of the 8×8 square block B1 from the first line buffer 1611, and determines whether a difference between the average pixel value of the 8×8 square block B1 read out from the first line buffer 1611 and the average pixel value of the 8×8 square block B3 calculated by the first block-image averaging unit 1603 is equal to or smaller than a predetermined threshold (hereinafter, "a third threshold") (Step S1805). Incidentally, the third threshold can be set to an appropriate value.

When the first block-image application determining unit 1602 determines that the difference exceeds the third threshold (NO at Step S1805), the process control goes to Step S1810. The settings of the average pixel value and the flag of the 8×8 square block B3 in the line buffers 1611 and 1612 (Step S1810), and the averaging process on the basis of the 4×4 square block (Step S1811) are performed.

On the other hand, when determining that the difference is equal to or smaller than the third threshold (YES at Step S1805), the first block-image application determining unit 1602 further determines whether the averaging process has been performed on image data of the 8×8 square block B2 located on the left of the 8×8 square block B3 by reading out a flag of the 8×8 square block B2 from the second line buffer 1612 (Step S1806). When it is determined that the averaging process has not been performed on the image data of the 8×8 square block B2 (NO at Step S1806), the process control goes to Step S1808.

On the other hand, when determining that the averaging process has been performed on the image data of the 8×8 square block B2 (YES at Step S1806), the first block-image application determining unit 1602 reads out the average pixel value of the 8×8 square block B2 from the first line buffer 1611, and determines whether a difference between the average pixel value of the 8×8 square block B2 read out from the first line buffer 1611 and the average pixel value of the 8×8 square block B3 calculated by the first block-image averaging unit 1603 is equal to or smaller than the third threshold (Step S1807).

When the first block-image application determining unit 1602 determines that the difference exceeds the third threshold (NO at Step S1807), the process control goes to Step S1810. The settings of the average pixel value and the flag of the 8×8 square block B3 in the line buffers 1611 and 1612 (Step S1810) and the averaging process on the basis of the 4×4 square block (Step S1811) are performed.

On the other hand, when determining that the difference is equal to or smaller than the third threshold (YES at Step S1807), the first block-image application determining unit 1602 sets the average pixel value of the 8×8 square block B3 in the first line buffer 1611, and sets the flag of the 8×8 square block B3 as "implemented" in the second line buffer 1612 (Step S1808). After that, the first block-image application determining unit 1602 outputs the image data of the 8×8 square block B3 after the averaging process is performed thereon to the foreground-image compressing unit 103 via the selector 604 (Step S1809).

In this manner, when the averaging process has been performed on image data of any of adjacent 8×8 square blocks located on the left and top of the 8×8 square block in currently processing, if a difference between the average pixel values of the adjacent 8×8 square block and the 8×8 square block in currently processing exceeds the third threshold, image data of the 8×8 square block in currently processing is subdivided into four 4×4 square blocks so that the averaging process is performed on the basis of the 4×4 square block. Therefore, out of the 4×4 square blocks, a 4×4 square block in abutment with any of the adjacent 8×8 square blocks located on the left and top of the 8×8 square block in currently processing can be set at an average pixel value of pixels close to the adjacent 8×8 square block. Therefore, it is possible to prevent the boundary between the 8×8 square blocks from being prominent.

Furthermore, in the image processing apparatus 400, it is possible to reduce a block noise due to the edges between the 8×8 square blocks of the foreground image data.

Subsequently, an image processing apparatus 500 according to a fifth embodiment of the present invention is explained below. The difference between the image processing apparatus 500 and the image processing apparatuses according to the first to fourth embodiments is that the image processing apparatus 500 includes an image separating unit 1900 instead of the image separating unit 108. The portions identical to those in FIG. 1 are denoted with the same reference numerals, and the description of those portions is omitted.

Figure 19:
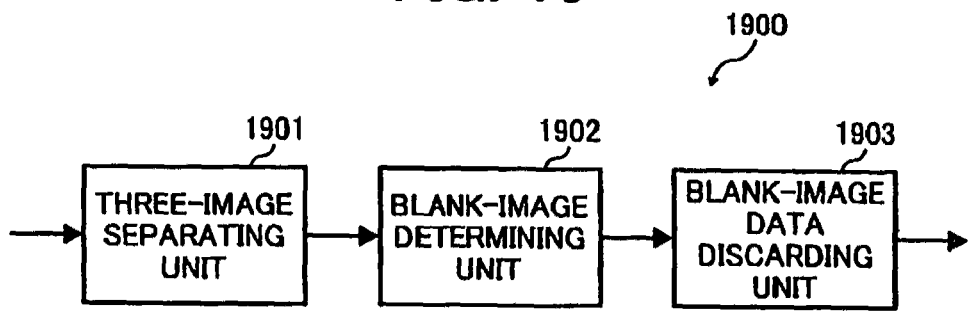
FIG. 19 is a block diagram of an image separating unit included in an image processing apparatus according to a fifth embodiment of the present invention.

FIG. 19 is a block diagram of the image separating unit 1900. The image separating unit 1900 includes a three-image separating unit 1901, a blank-image determining unit 1902, and a blank-image data discarding unit 1903.

When image data acquired via the network or from the scanner unit is input to the three-image separating unit 1901 as input image data, the three-image separating unit 1901 separates the input image data into foreground image data, background image data, and mask image data, and outputs the foreground image data, the background image data, and the mask image data to the blank-image determining unit 1902.

Upon receiving the foreground image data, the background image data, and the mask image data, the blank-image determining unit 1902 determines whether each of the foreground image data, the background image data, and the mask image data includes any information on an image to be displayed, such as picture information, shape information of a text, and color information of the text.

The blank-image data discarding unit 1903 outputs only the image data including any information on an image to be displayed to the foreground-image resolution converting unit 101, the mask-image compressing unit 104, and the background-image resolution converting unit 105.

Specifically, when the blank-image determining unit 1902 determines that any of the foreground image data, the background image data, and the mask image data does not include any of picture information, shape information of the text, and color information of the text, the blank-image data discarding unit 1903 discards the corresponding image data, and outputs the other image data to the foreground-image resolution converting unit 101, the mask-image compressing unit 104, and the background-image resolution converting unit 105.

As a result, the merging unit 107 merges only the image data including the information on the image to be displayed.

Figure 20:
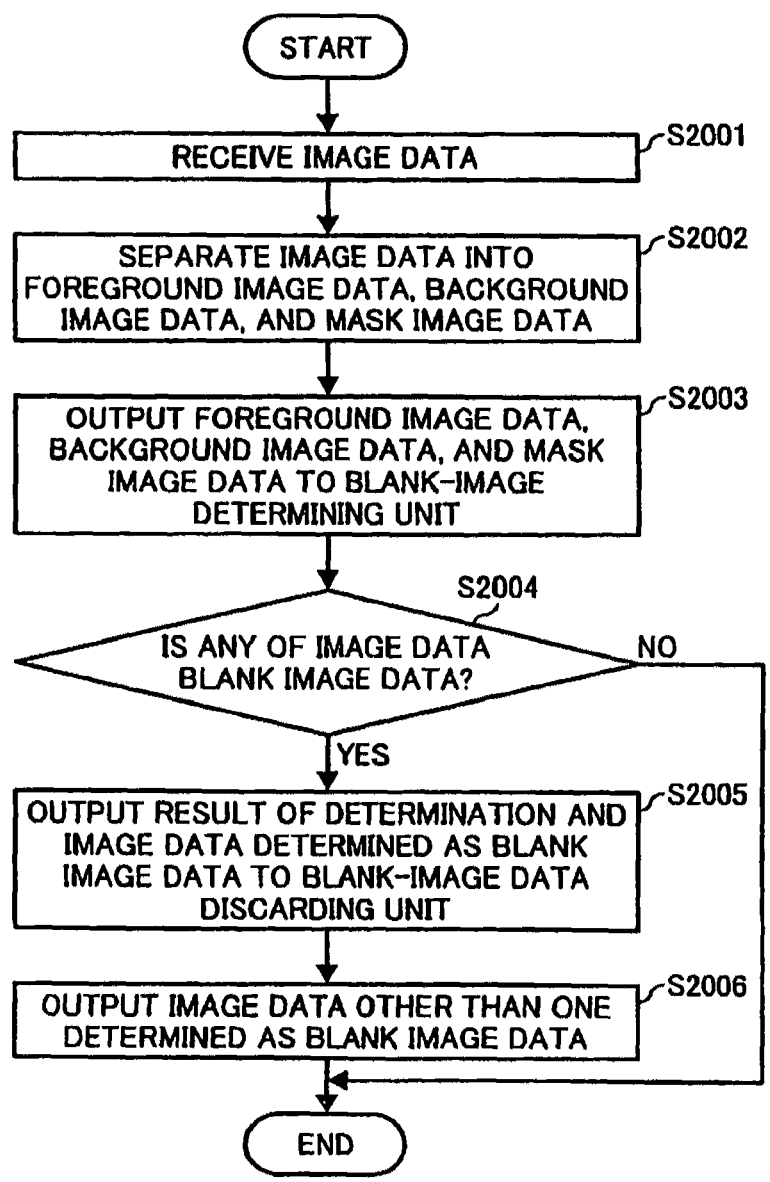
FIG. 20 is a flowchart of a process performed by the image processing apparatus according to the fifth embodiment.

FIG. 20 is a flowchart of a process performed by the image processing apparatus 500.

First, when image data acquired via the network or from the scanner unit is input to the three-image separating unit 1901 as input image data (Step S2001), the three-image separating unit 1901 separates the input image data into foreground image data, background image data, and mask image data (Step S2002).

The three-image separating unit 1901 outputs the foreground image data, the background image data, and the mask image data to the blank-image determining unit 1902 (Step S2003).

Upon receiving the foreground image data, the background image data, and the mask image data, the blank-image determining unit 1902 determines whether each of the foreground image data, the background image data, and the mask image data is image data on a blank image (Step S2004).

When determining that any of the foreground image data, the background image data, and the mask image data is image data on a blank image (YES at Step S2004), the blank-image determining unit 1902 outputs a result of the determination and the corresponding image data, i.e., blank image data to the blank-image data discarding unit 1903 (Step S2005).

When the image data is to be merged into a file, the blank-image data discarding unit 1903 discards the blank image data, and outputs the other image data to the corresponding unit (Step S2006).

In this manner, in the fifth embodiment, when any of the foreground image data, the background image data, and the mask image data is blank image data, the blank image data is discarded. Therefore, it is possible to reduce a file size, and it is also possible to compress the image data excluding unnecessary image data.

The image processing apparatuses according to the first to fifth embodiments include a control unit such as a central processing unit (CPU), a memory unit such as a read-only memory (ROM) or a random access memory (RAM), an external storage unit such as a hard disk drive (HDD) or a compact disk (CD) drive, a display unit, and an input unit such as a keyboard or a mouse. The image processing apparatuses according to the first to fifth embodiments build a hardware configuration with a commonly-used computer.

An image processing program executed by the image processing apparatuses according to the first to fifth embodiments is stored in a computer-readable recording medium, such as a CD-ROM, a flexible disk (FD), a CD recordable (CD-R), or a digital versatile disk (DVD), in an installable or executable file format.

Alternatively, the image processing program can be stored on a computer connected to a network such as the Internet so as to be downloaded via the network. Furthermore, the image processing program can be provided or distributed via the network.

Moreover, the image processing program can be preliminarily built into the memory unit, such as the ROM, of the image processing apparatuses according to the first to fifth embodiments.

The image processing program is composed of modules including the elements included in the image processing apparatuses according to the first to fifth embodiments (i.e., the image separating unit, the foreground-image resolution converting unit, the averaging unit, the foreground-image compressing unit, the mask-image compressing unit, the background-image resolution converting unit, the background-image compressing unit, and the merging unit). The CPU as an actual hardware reads out the image processing program from the recording medium, and executes the image processing program, whereby the above elements are loaded on the main memory unit, i.e., the image separating unit, the foreground-image resolution converting unit, the averaging unit, the foreground-image compressing unit, the mask-image compressing unit, the background-image resolution converting unit, the background-image compressing unit, and the merging unit are created on the main memory unit.

According to an aspect of the present invention, foreground image data is divided into square blocks, and if image data of each of the square blocks does not significantly vary in gray scale, the image data is averaged with an average pixel value of the square block. Therefore, when the foreground image data is compressed, it is possible to improve an efficiency of the compression.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a separating unit that separates image data into foreground image data, background image data, and mask image data, the foreground image data including color information of a first area of the image data where a text or a line image is included, the background image data including an image of a second area of the image data where a picture is included, and the mask image data including shape information of the text or the line image;
    a resolution converting unit that converts the foreground image data into low-resolution foreground image data;
    a dividing unit that divides the low-resolution foreground image data into a plurality of square blocks composed of a plurality of pixels;

a determining unit that determines whether a difference between pixel values of the pixels included in each of the square blocks exceeds a predetermined threshold for averaging;

an averaging unit that calculates an average pixel value of the pixels included in each of the square blocks, and changes pixel values of the pixels in the square blocks to the average pixel value of that square block thereby obtaining averaged foreground image data of the square blocks;

a compressing unit that performs a compression process on the averaged foreground image data of the square blocks thereby obtaining compressed foreground image data of the square blocks; and a merging unit that merges the compressed foreground image data of all the square blocks with the background image data, and the mask image data thereby obtaining compressed image data, wherein the averaging unit does not calculate an average pixel value of the pixels included in a square block for which the determining unit determines that a difference between the pixel values of the pixels included in that square block exceeds the threshold for averaging to maintain the pixel values of the pixels included in that square block.

2. The image processing apparatus according to claim 1, further comprising:

a subdividing unit that subdivides each first square block from among the square blocks for which the determining unit determines that the difference between the pixel values included therein exceeds the first threshold into smaller square blocks composed of a plurality of pixels;

a subdivided-image averaging unit that calculates an average pixel value of the pixels included in each of the smaller square blocks, and changes pixel values of the pixels in the smaller square blocks to the average pixel value of that smaller square block thereby obtaining averaged foreground image data of the smaller square blocks; and a subdivided-image merging unit that merges the averaged foreground image data of all the smaller square blocks thereby obtaining averaged foreground image data of the first square blocks, wherein the averaging unit calculates an average pixel value of the pixels included in a second square block from among the square blocks for which the determining unit determines that the difference between the pixel values included therein does not exceed the first threshold, and changes pixel values of the pixels in the second square blocks to the average pixel value of that second square block thereby obtaining averaged foreground image data of the second square blocks, and the compressing unit performs the compression process on the foreground image data of the first square blocks and the second square blocks.

3. The image processing apparatus according to claim 2, further comprising a filtering unit that performs a filtering process on the foreground image data of each of the first square blocks thereby obtaining filtered foreground image data of the first square blocks, wherein the compressing unit performs the compression process on the filtered foreground image data of the first square blocks and the second square blocks.

4. The image processing apparatus according to claim 2, wherein the determining unit determines as the first square block a square block for which a difference between an average pixel value of a third square block from among the square blocks clock( ) and an average pixel value of a fourth square block adjacent to the third square block exceeds a predetermined second threshold, and the subdividing unit subdivides the first square block into smaller square blocks.

5. The image processing apparatus according to claim 1, further comprising a blank-image determining unit that determines whether any of the foreground image data, the background image data, and the mask image data is blank image data, wherein the merging unit merges any of the foreground image data, the background image data, and the mask image data with exception of ones determined as the blank image data by the blank-image determining unit.

6. An image processing method comprising:

separating image data into foreground image data, background image data, and mask image data, the foreground image data including color information of a first area of the image data where a text or a line image is included, the background image data including an image of a second area of the image data where a picture is included, and the mask image data including shape information of the text or the line image;

converting the foreground image data into low-resolution foreground image data;

dividing the low-resolution foreground image data into a plurality of square blocks composed of a plurality of pixels;

determining whether a difference between pixel values of the pixels included in each of the square blocks exceeds a predetermined threshold for averaging;

first calculating an average pixel value of the pixels included in each of the square blocks, and changing pixel values of the pixels in the square blocks to the average pixel value of that square block, thereby obtaining averaged foreground image data of the square blocks, if the difference between pixel values of the pixels included in each of the square blocks does not exceed the predetermined threshold;

performing a compression process on the averaged foreground image data of the square blocks thereby obtaining compressed foreground image data of the square blocks; and first merging the compressed foreground image data of all the square blocks with the background image data, and the mask image data thereby obtaining compressed image data.

7. The image processing method according to claim 6, further comprising:

determining whether a difference between pixel values of the pixels included in each of the square blocks exceeds a predetermined first threshold;

subdividing each first square block from among the square blocks for which it is determined at the determining that the difference between the pixel values included therein exceeds the first threshold into smaller square blocks composed of a plurality of pixels;

second calculating an average pixel value of the pixels included in each of the smaller square blocks, and changing pixel values of the pixels in the smaller square blocks to the average pixel value of that smaller square block thereby obtaining averaged foreground image data of the smaller square blocks; and second merging the averaged foreground image data of all the smaller square blocks thereby obtaining averaged foreground image data of the first square blocks, wherein the first calculating includes calculating an average pixel value of the pixels included in a second square block from among the square blocks for which it is determined at the determining that the difference between the pixel values included therein does not exceed the first threshold, and changing pixel values of the pixels in the second square blocks to the average pixel value of that second square block thereby obtaining averaged foreground image data of the second square blocks, and the performing includes performing the compression process on the foreground image data of the first square blocks and the second square blocks.

8. The image processing method according to claim 7, further comprising filtering the foreground image data of each of the first square blocks thereby obtaining filtered foreground image data of the first square blocks, wherein the performing includes performing the compression process on the filtered foreground image data of the first square blocks and the second square blocks.

9. The image processing method according to claim 7, wherein the determining includes determining as the first square block a square block for which a difference between an average pixel value of a third square block from among the square blocks clacks and an average pixel value of a fourth square block adjacent to the third square block exceeds a predetermined second threshold, and the subdividing includes subdividing the first square block into smaller square blocks.

10. A computer program product including a computer-readable recording medium having a computer program stored thereon which when executed on a computer causes the computer to execute:

separating image data into foreground image data, background image data, and mask image data, the foreground image data including color information of a first area of the image data where a text or a line image is included, the background image data including an image of a second area of the image data where a picture is included, and the mask image data including shape information of the text or the line image;

converting the foreground image data into low-resolution foreground image data;

dividing the low-resolution foreground image data into a plurality of square blocks composed of a plurality of pixels;

determining whether a difference between pixel values of the pixels included in each of the square blocks exceeds a predetermined threshold for averaging;

first calculating an average pixel value of the pixels included in each of the square blocks, and changing pixel values of the pixels in the square blocks to the average pixel value of that square block, thereby obtaining averaged foreground image data of the square blocks, if the difference between pixel values of the pixels included in each of the square blocks does not exceed the predetermined threshold;

performing a compression process on the averaged foreground image data of the square blocks thereby obtaining compressed foreground image data of the square blocks; and first merging the compressed foreground image data of all the square blocks with the background image data, and the mask image data thereby obtaining compressed image data.

* * * * *